(12) United States Patent
Amundson et al.

(10) Patent No.: US 8,185,245 B2
(45) Date of Patent: *May 22, 2012

(54) HVAC CONTROL WITH UTILITY TIME OF DAY PRICING SUPPORT

(75) Inventors: John Amundson, Minneapolis, MN (US); Jeffrey Boll, Brooklyn Park, MN (US); Peter Joseph Erickson, Crystal, MN (US); Michael Lunacek, Rogers, MN (US); Patrick C. Tessier, Oakdale, MN (US)

(73) Assignee: Honeywell International Inc., Morristown, NJ (US)

( * ) Notice: Subject to any disclaimer, the term of this patent is extended or adjusted under 35 U.S.C. 154(b) by 275 days.

This patent is subject to a terminal disclaimer.

(21) Appl. No.: 12/692,376

(22) Filed: Jan. 22, 2010

(65) Prior Publication Data

US 2011/0184562 A1    Jul. 28, 2011

(51) Int. Cl.
*G01M 1/38* (2006.01)
*G05D 3/12* (2006.01)

(52) U.S. Cl. .................................. 700/277; 700/295

(58) Field of Classification Search .............. 700/276, 700/277, 295
See application file for complete search history.

(56) References Cited

U.S. PATENT DOCUMENTS

| | | |
|---|---|---|
| 4,216,384 A | 8/1980 | Hurley |
| 4,228,511 A | 10/1980 | Simcoe et al. |
| 4,337,401 A | 6/1982 | Olson |
| 4,341,345 A | 7/1982 | Hammer et al. |
| 4,345,162 A | 8/1982 | Hammer et al. |

(Continued)

FOREIGN PATENT DOCUMENTS

EP    0735516    6/2004

(Continued)

OTHER PUBLICATIONS http://www.comfortchoice.carrier.com/details_printable, "EMi—Carrier's Internet Communicating Programmable Thermostat," 1 page, printed May 22, 2007.

(Continued)

*Primary Examiner* — Ryan Jarrett
(74) *Attorney, Agent, or Firm* — Seager Tufte & Wickhem LLC

(57) ABSTRACT

The present disclosure provides a method for operating a utility-powered HVAC system for conditioning inside air of a building. In an illustrative but non-limiting example, a nominal schedule is maintained by a local HVAC controller, where the nominal schedule has a number of days and one or more time periods for each of at least some of the days. The nominal schedule also has at least one setpoint associated with each of the time periods. The local HVAC controller is configured to accept manual input from a user via a user interface. The manual input may include accepting entry of a utility pricing schedule that corresponds to scheduled price changes of a utility. The utility pricing schedule may include at least one enhanced pricing time period. Entry of at least one utility price level setpoint offset may also be accepted to correspond to each of the enhanced pricing time periods. The nominal schedule may then be modified or overridden to include the utility pricing schedule, resulting in a utility pricing operating schedule. One or more HVAC units may then be controlled by the local HVAC controller in accordance with the utility pricing operating schedule.

20 Claims, 21 Drawing Sheets

U.S. PATENT DOCUMENTS

| | | | |
|---|---|---|---|
| 4,382,544 | A | 5/1983 | Stewart |
| 4,401,262 | A | 8/1983 | Adams et al. |
| 4,509,585 | A | 4/1985 | Carney et al. |
| 4,583,182 | A | 4/1986 | Breddan |
| 4,657,179 | A | 4/1987 | Aggers et al. |
| 4,702,413 | A | 10/1987 | Beckey et al. |
| 4,706,882 | A | 11/1987 | Barnard |
| 4,764,766 | A | 8/1988 | Aoyama et al. |
| 4,828,016 | A | 5/1989 | Brown et al. |
| 4,839,636 | A | 6/1989 | Zeiss |
| 4,911,358 | A | 3/1990 | Mehta |
| 4,991,770 | A | 2/1991 | Bird et al. |
| 5,025,984 | A | 6/1991 | Bird et al. |
| 5,218,399 | A | 6/1993 | Izumi et al. |
| 5,219,119 | A | 6/1993 | Kasper et al. |
| 5,244,146 | A | 9/1993 | Jefferson et al. |
| 5,270,952 | A | 12/1993 | Adams et al. |
| 5,289,362 | A | 2/1994 | Liebl et al. |
| 5,314,004 | A | 5/1994 | Strand et al. |
| 5,395,042 | A | 3/1995 | Riley et al. |
| 5,454,511 | A | 10/1995 | Van Ostrand et al. |
| 5,459,374 | A | 10/1995 | Thoeny et al. |
| 5,462,225 | A | 10/1995 | Massara et al. |
| 5,482,209 | A | 1/1996 | Cochran et al. |
| 5,539,633 | A | 7/1996 | Hildebrand et al. |
| 5,555,927 | A | 9/1996 | Shah |
| 5,572,438 | A | 11/1996 | Ehlers et al. |
| 5,598,349 | A | 1/1997 | Elliason et al. |
| 5,622,310 | A | 4/1997 | Meyer |
| 5,644,173 | A | 7/1997 | Elliason et al. |
| 5,729,474 | A | 3/1998 | Hildebrand et al. |
| 5,816,491 | A | 10/1998 | Berkeley et al. |
| 5,822,997 | A | 10/1998 | Atterbury |
| 5,833,134 | A | 11/1998 | Ho et al. |
| 5,884,248 | A | 3/1999 | Hall |
| 5,903,327 | A | 5/1999 | Hijii |
| 5,926,776 | A | 7/1999 | Glorioso et al. |
| 6,104,399 | A | 8/2000 | Volkel |
| 6,122,603 | A | 9/2000 | Budike, Jr. |
| 6,152,375 | A | 11/2000 | Robison |
| 6,167,389 | A | 12/2000 | Davis et al. |
| 6,185,483 | B1 * | 2/2001 | Drees ............................ 700/295 |
| 6,236,443 | B1 | 5/2001 | Carlsen |
| 6,254,009 | B1 | 7/2001 | Proffitt et al. |
| 6,260,765 | B1 | 7/2001 | Natale et al. |
| 6,264,110 | B1 | 7/2001 | Proffitt et al. |
| 6,305,611 | B1 | 10/2001 | Proffitt et al. |
| 6,311,105 | B1 | 10/2001 | Budike, Jr. |
| 6,437,692 | B1 | 8/2002 | Petite et al. |
| 6,478,233 | B1 | 11/2002 | Shah |
| 6,480,803 | B1 | 11/2002 | Pierret et al. |
| 6,496,168 | B1 | 12/2002 | Tomida |
| 6,502,758 | B2 | 1/2003 | Cottrell |
| 6,519,509 | B1 | 2/2003 | Nierlich et al. |
| 6,549,870 | B2 | 4/2003 | Proffitt et al. |
| 6,574,581 | B1 | 6/2003 | Bohrer et al. |
| 6,619,555 | B2 | 9/2003 | Rosen |
| 6,622,925 | B2 | 9/2003 | Carner et al. |
| 6,634,566 | B2 | 10/2003 | Archacki, Jr. et al. |
| 6,643,567 | B2 | 11/2003 | Kolk et al. |
| 6,671,586 | B2 | 12/2003 | Davis et al. |
| 6,681,154 | B2 | 1/2004 | Nierlich et al. |
| 6,741,915 | B2 | 5/2004 | Poth |
| 6,785,630 | B2 | 8/2004 | Kolk et al. |
| 6,786,421 | B2 | 9/2004 | Rosen |
| 6,789,739 | B2 | 9/2004 | Rosen |
| 6,862,498 | B2 | 3/2005 | Davis et al. |
| 6,868,293 | B1 | 3/2005 | Schurr et al. |
| 6,879,806 | B2 | 4/2005 | Shorty |
| 6,904,385 | B1 | 6/2005 | Budike, Jr. |
| 6,931,445 | B2 | 8/2005 | Davis |
| 6,975,958 | B2 | 12/2005 | Bohrer et al. |
| 6,980,080 | B2 | 12/2005 | Christensen et al. |
| 6,988,671 | B2 | 1/2006 | DeLuca |
| 6,993,417 | B2 | 1/2006 | Osann, Jr. |
| 7,000,849 | B2 | 2/2006 | Ashworth et al. |
| 7,010,363 | B2 | 3/2006 | Donnelly et al. |
| 7,039,532 | B2 | 5/2006 | Hunter |
| 7,049,976 | B2 | 5/2006 | Hunt et al. |
| 7,053,767 | B2 | 5/2006 | Petite et al. |
| 7,103,511 | B2 | 9/2006 | Petite |
| 7,130,719 | B2 | 10/2006 | Ehlers et al. |
| 7,133,414 | B2 | 11/2006 | Archacki, Jr. |
| 7,172,132 | B2 | 2/2007 | Proffitt et al. |
| 7,184,861 | B2 | 2/2007 | Petite |
| 7,230,544 | B2 | 6/2007 | Van Heteren |
| 7,279,659 | B2 | 10/2007 | Gagas et al. |
| 7,346,467 | B2 | 3/2008 | Bohrer et al. |
| 7,364,093 | B2 | 4/2008 | Garozzo |
| 7,420,293 | B2 | 9/2008 | Donnelly et al. |
| 7,434,742 | B2 | 10/2008 | Mueller et al. |
| 7,991,513 | B2 * | 8/2011 | Pitt ............................. 700/295 |
| 2001/0010032 | A1 | 7/2001 | Ehlers et al. |
| 2004/0034484 | A1 | 2/2004 | Solomita, Jr. et al. |
| 2004/0260411 | A1 | 12/2004 | Cannon |
| 2005/0040943 | A1 | 2/2005 | Winick |
| 2005/0119766 | A1 | 6/2005 | Amundson et al. |
| 2005/0194456 | A1 * | 9/2005 | Tessier et al. .................. 236/51 |
| 2005/0195757 | A1 | 9/2005 | Kidder et al. |
| 2006/0049694 | A1 | 3/2006 | Kates |
| 2007/0165835 | A1 | 7/2007 | Berkman |
| 2007/0239317 | A1 | 10/2007 | Bogolea et al. |
| 2008/0011864 | A1 | 1/2008 | Tessier et al. |
| 2008/0122585 | A1 | 5/2008 | Castaldo et al. |
| 2008/0177678 | A1 | 7/2008 | Di Martini et al. |
| 2008/0262979 | A1 | 10/2008 | Metcalfe |
| 2008/0272934 | A1 | 11/2008 | Wang et al. |
| 2009/0001180 | A1 | 1/2009 | Siddaramanna et al. |
| 2009/0001181 | A1 | 1/2009 | Siddaramanna et al. |
| 2009/0077397 | A1 | 3/2009 | Shnekendorf et al. |
| 2009/0187499 | A1 | 7/2009 | Mulder et al. |
| 2009/0198384 | A1 | 8/2009 | Ahn |
| 2009/0295594 | A1 | 12/2009 | Yoon |
| 2009/0302994 | A1 | 12/2009 | Rhee et al. |
| 2009/0302996 | A1 | 12/2009 | Rhee et al. |
| 2009/0305644 | A1 | 12/2009 | Rhee et al. |
| 2010/0070101 | A1 | 3/2010 | Benes et al. |
| 2010/0094737 | A1 | 4/2010 | Lambird et al. |
| 2011/0184564 | A1 * | 7/2011 | Amundson et al. ........... 700/278 |
| 2011/0184565 | A1 * | 7/2011 | Peterson ....................... 700/278 |
| 2011/0238224 | A1 * | 9/2011 | Schnell et al. ................ 700/278 |

FOREIGN PATENT DOCUMENTS

| | | |
|---|---|---|
| GB | 2333494 | 1/1998 |
| WO | 8501851 | 4/1985 |
| WO | 9621264 | 7/1996 |
| WO | 9808179 | 2/1998 |
| WO | 0152478 | 7/2001 |
| WO | 03032103 | 4/2003 |
| WO | 03084022 | 10/2003 |
| WO | 2006096854 | 9/2006 |

OTHER PUBLICATIONS http://www.comfortchoice.carrier.com/details_printable, "Carrier How Does it Work?", 1 page, printed May 22, 2007.

http://www.comfortchoice.carrier.com/details_printable, "Carrier System Elements and Hardware," 1 page, printed May 22, 2007.

http://www.comverge.com/printer.cfm, "Maingate Home," 1 page, printed May 22, 2007.

http://www.lightstat.com/products/utility.asp, "Lightstat Products for Utility Demand Response and Load Curtailment Programs," 2 pages, printed May 22, 2007.

http://www.smarthome.com/3020t.html, "Aprilaire Communicating Thermostat," 4 pages, printed May 16, 2007.

Carrier ComfortChoice "Verifiable Demand Response, Two-Way Communicating Thermostat," 4 pages, 2007.

Carrier ComfortChoice, Web Interface, User Guide, pp. 1-6, Jan. 2002.

Central and Southwest Communications, Customer Choice and Control Thermostat Touchpad, User Guide, 18 pages, May 1996.

Comverge, Inc., "Adaptive Algorithms Yield Greater Performance," 2 pages, prior to Jun. 28, 2007.

Comverge, Inc., "SuperStat Thermostat Family," 2 pages, prior to Jun. 28, 2007.

Federal Energy Regulatory Commission, "Assessment of Demand Response & Advanced Metering, Staff Report," 228 pages, Aug. 2006.

Honeywell, R4525A Load Relay Module, Installation Instructions, 4 pages, 1995.

Honeywell, Programmable Load Controller Weekday/Weekend (5-day/Saturday/Sunday) Programmable Heat and/or Cool Conventional and Heat Pump T7512A,B,C, User's Guide, 32 pages, 1996.

Honeywell Cannon Technologies Alliance, T7512A,B Programmable Load Management Thermostat, Installation Instructions, 8 pages, 2002.

Honeywell Cannon Technologies Alliance, Programmable Load Management Thermostat Weekday/Weekend (5-day/Saturday/Sunday) T7512A,B, User's Guide, 32 pages, 2002.

Honeywell, T7512A,B,C,D Programmable Load Controller, Installation Instructions, 8 pages, 1997.

Honeywell, T7525/T7526 Thermostat Touchpad, User Guide, 16 pages, 1995.

Honeywell, "TotalHome Energy Management System 2000," 12 pages, 1995.

Honeywell, TotalHome Energy Management System 2000, Specification Data, 2 pages, 1996.

Honeywell, W8525A,B,C,D Control Module, Installation Instructions, 8 pages, 1995.

i-Stat, Installation and Operation Manual, for Low Voltage (24VAC) Systems Only, 14 pages, Nov. 2002.

LightStat, "Model RTPstat Thermostat," 2 pages, prior to Jun. 28, 2007.

Lightstat, "Virtual Gateway," 2 pages, prior to Jun. 28, 2007.

Honeywell, CM907 Programmable Thermostat, Product Specification Sheet, 7 pages, Sep. 2006.

U.S. Appl. No. 60/368,963, 202 pages, filed Mar. 28, 2002.

U.S. Appl. No. 60/383,027, 26 pages, filed May 24, 2002.

LuxPro, PSD122E Everything 'Stat, 2 pages, prior to Jun. 28, 2007.

LuxPro, PSP722E Everything 'Stat, 2 pages, prior to Jun. 28, 2007.

PSD122E, Installation and Operating Instructions, 6 pages, prior to Jun. 28, 2007.

PSP722E, Installation and Operating Instructions, 8 pages, prior to Jun. 28, 2007.

* cited by examiner

HVAC CONTROL WITH UTILITY TIME OF DAY PRICING SUPPORT

TECHNICAL FIELD

The disclosure pertains generally to HVAC control, and more particularly, to HVAC control with utility time of day pricing support.

BACKGROUND

Heating, ventilation, and/or air conditioning (HVAC) systems are often used to control the comfort level within a building or other structure. Many HVAC systems include a controller that activates and deactivates one or more HVAC units or components of the HVAC system to affect and control one or more environmental conditions within the building. These environmental conditions can include, but are not limited to, temperature, humidity, and/or ventilation. In many cases, such an HVAC controller may include, or have access to, one or more sensors, and may use parameters provided by the one or more sensors to control the one or more HVAC components to achieve desired programmed or set environmental conditions.

An HVAC controller may be equipped with a user interface that allows a user to monitor and adjust the environmental conditions at one or more locations within the building. With more modern designs, the interface typically includes a display panel, such as a liquid crystal display panel, inset within a housing that contains a microprocessor as well as other components of the HVAC controller. In some designs, the user interface may permit the user to program the controller to activate on a certain schedule determined by the user. For example, the interface may include a routine that permits the user to change the temperature at one or more times during a particular day and/or group of days. Such a programmable schedule may help reduce energy consumption of the HVAC system by changing the setpoint to an energy saving set back temperature during certain times, such as when the building or space is expected to be unoccupied or when the occupants are expected to be sleeping.

Energy is supplied to most HVAC systems by one or more utilities, such as an electric utility and/or a gas utility. During peak demand periods, such as during hot summer days, such utilities may vary the rates that they charge for energy. Customers may wish to modify their energy consumption in response to these varying rates in order to reduce their energy bills. What would be desirable, therefore, is a new HVAC controller that can help customers modify their energy consumption during peak or anticipated peak demand periods.

SUMMARY

The disclosure relates generally to Heating, Ventilation, and Air Conditioning (HVAC) control, and more particularly, to HVAC control with utility time of day pricing support.

In some instances, control of an HVAC system may be modified based upon manually-entered utility pricing schedule information. In an illustrative but non-limiting example, a nominal schedule may be maintained in a memory of a local HVAC controller, where the nominal schedule has a number of days and one or more time periods for each of at least some of the days. The nominal schedule may also have at least one setpoint associated with each of the time periods. Manual input may be received via a user interface of the local HVAC controller. The manual input may include accepting entry of a utility pricing schedule that corresponds to scheduled price changes of a utility. The utility pricing schedule may include at least one enhanced pricing time period. Entry of at least one utility price level setpoint offset may also be accepted to correspond to each of the enhanced pricing time periods. The nominal schedule may then be modified or overridden to include the utility pricing schedule, resulting in a utility pricing operating schedule. One or more HVAC units may then be controlled by the local HVAC controller in accordance with the utility pricing operating schedule.

The above summary is not intended to describe each and every disclosed illustrative example or every implementation of the disclosure. The Description that follows more particularly exemplifies various illustrative embodiments.

BRIEF DESCRIPTION OF THE FIGURES

The following description should be read with reference to the drawings. The drawings, which are not necessarily to scale, depict selected illustrative embodiments and are not intended to limit the scope of the disclosure. The disclosure may be more completely understood in consideration of the following description of various illustrative embodiments in connection with the accompanying drawings, in which.

DESCRIPTION

The following description should be read with reference to the drawings, in which like elements in different drawings are numbered in like fashion. The drawings, which are not necessarily to scale, depict selected illustrative embodiments and are not intended to limit the scope of the invention. Although examples of construction, dimensions, and materials are illustrated for the various elements, those skilled in the art will recognize that many of the examples provided have suitable alternatives that may be utilized.

Figure 1:
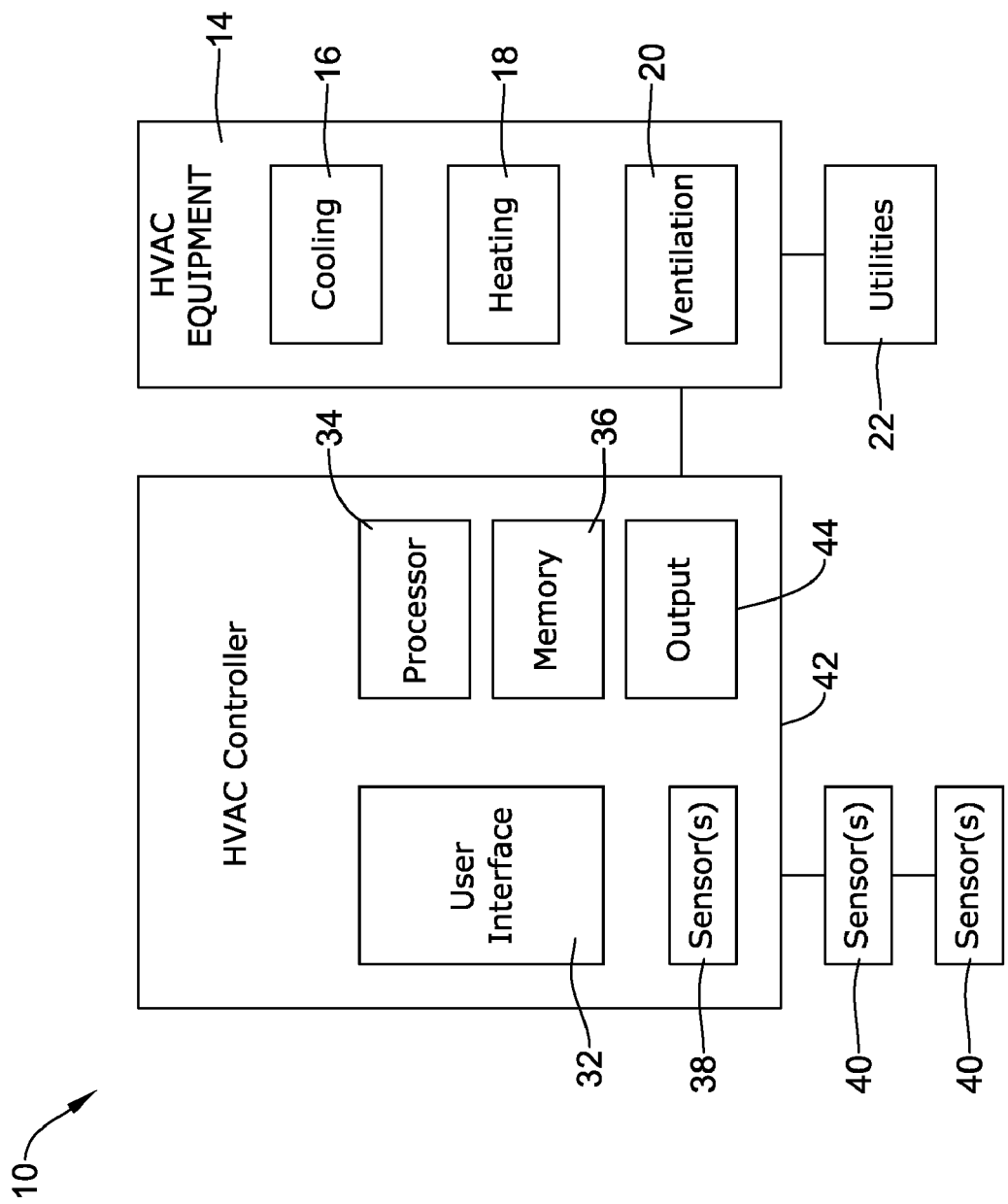
FIG. 1 is a schematic diagram showing an illustrative HVAC system 10 for conditioning the inside air of a building.

FIG. 1 is a schematic diagram showing an illustrative HVAC system 10 for conditioning the inside air of a building. The methods and devices of the present disclosure may be practiced with HVAC system 10 and/or as part of HVAC system 10, but they are not limited to HVAC systems. It is contemplated that the methods and devices of the present disclosure may be practiced with other systems, such as water heating systems, lighting systems, manufacturing systems, sprinkler systems, etc. For convenience, an HVAC system 10 is used as an example below.

The illustrative HVAC system 10 of FIG. 1 includes an HVAC controller 12, which may be a thermostat, and may be configured to interact with and control HVAC equipment 14. HVAC controller 12 may be a local HVAC controller, located in the building that is conditioned by the HVAC equipment 14, or in close proximity to the building, such as within a complex of neighboring buildings. HVAC equipment 14 may include, for example, one or more of cooling unit 16, heating unit 18 and/or ventilation unit 20. HVAC equipment 14 may include other units such as a humidifier unit, a dehumidifier unit, a UV filter unit and/or any other suitable HVAC unit. In some cases, cooling unit 16 and heating unit 18 may, for example, be combined in a forced air system, or perhaps a heat pump system, particularly in residential and/or light commercial applications. In other cases, one or more of cooling unit 16, heating unit 18 and/or ventilation unit 20 may be distinct systems controlled, either directly or indirectly, by HVAC controller 12. In some instances, it is contemplated that HVAC controller 12 may represent two or more distinct controllers, each controlling different equipment within HVAC equipment 14, and/or different zones within a structure.

HVAC controller 12 may include any suitable components related to effecting control of the HVAC system 10. For example, HVAC controller 12 may include a user interface 32. The user interface 32 may include one or more displays and/or buttons that a user may interact with. In some instances, a touchscreen display may be provided. In the illustrative embodiment, HVAC controller 12 includes a processor 34, which may be a microprocessor, and a memory 36 which may be used to store any appropriate information such as HVAC control routines or code, historical performance data, HVAC system parameters, one or more programmable schedules for changing HVAC system parameters over time, and so on. HVAC system parameters may include setpoints for heating, cooling, humidity, etc., modes for ventilation equipment, fan settings, and the like.

As shown, HVAC controller 12 may include one or more sensors, such as an internal sensor 38 located within a housing 42 of the HVAC controller 12, and/or external sensors 40, which may be located external to the controller housing 42. The external sensors 40 may be within the building and/or outside the building, as desired. HVAC controller 12 may include one or more outputs 44 configured to issue operation commands to HVAC equipment 14 and units 16, 18, 20.

One or more utilities 22 may provide energy to the HVAC system 10, including HVAC equipment 14. The utility or utilities 22 may supply a source of energy such as electricity, natural gas, hot water, steam, and/or any other suitable sources of energy. In order to help reduce peak loads, utilities are increasingly employing variable pricing schemes. Any number of pricing (rate) schemes may be employed. For example, energy rates may be raised during an enhanced pricing time period during the day compared to at night, due to higher anticipated demand for industrial and commercial use and/or greater demand for cooling during daylight hours. Any appropriate number of rate changes may be made during a day, such as a mid-tier or mid-peak rate becoming effective at the start of the work day, then a higher-tier or higher-peak rate becoming effective for the greatest temperature period later in the day when air conditioning loads are usually highest, then returning to a non-peak rate after the work day ends. In some arrangements, enhanced pricing time periods may recur on a daily basis, or they may recur daily within a group of days such as weekdays, with different rate schedules being effective on other groups of days such as weekends. In some cases, enhanced pricing time periods of a utility may recur on a weekly basis.

Schedules for recurrences of enhanced pricing time periods may vary over longer time intervals, such as between seasons. For example, a summer schedule for weekly recurrences of enhanced pricing time periods may be in force during warmer months of the year, and a different winter schedule may be in effect for colder months.

Utilities may plan and communicate schedules for rate/price changes well in advance of the dates for such changes. For example, summer and winter enhanced pricing rate schedules may be determined long before the in-force dates for the schedules. In other situations, enhanced pricing time periods may be declared and/or scheduled on shorter time scales, such as in response to a heat wave or a cold snap (periods of relatively extreme environmental temperatures), or even due to an unforeseen cause such as failure of a power generation facility or an international crisis that constrains energy supplies. In some situations a utility may enact an enhanced pricing time period of Critical Peak Pricing (CPP) with short notice (for example announcing a CPP event one day in advance), for example in response to actual or anticipated very high demand for energy.

In response to higher rates during enhanced pricing time periods, customers may desire to curtail energy consumption (and hence, demand on the utility) relative to consumption during periods of normal or nominal pricing. This may be accomplished by, for example, temporarily setting less comfortable setpoints. Generally speaking, a demand-side response to enhanced pricing may be achieved in a number of ways. A homeowner with a simple non-programmable thermostat may manually adjust the thermostat setpoint in response to rate changes. This approach may be relatively labor intensive and require substantial diligence on the part of the homeowner. In a more sophisticated approach, a local HVAC controller such as a thermostat may be configured to receive automated signals from a utility (such as via a wired and/or radio-frequency communication link) that communicate enhanced pricing information, and the HVAC controller may be configured to adjust HVAC system operation in a predetermined response to price changes without the need for immediate user action and/or awareness. Aspects of such a system are disclosed in, for example, U.S. Pat. No. 6,574,581, "PROFILE BASED METHOD FOR DERIVING A TEMPERATURE SETPOINT USING A 'DELTA' BASED ON CROSS-INDEXING A RECEIVED PRICE-POINT LEVEL SIGNAL," Bohrer, et al., which is hereby incorporated by reference in its entirety.

In one illustrative embodiment, the present disclosure provides methods and devices that assist utility customers in modifying HVAC system operation and energy consumption in view of rates changes of utilities during enhanced pricing time periods, without necessarily requiring an automated communication link between a utility and the HVAC system controller. In some instances, methods and devices are described that allow for manual entry of pricing schedule information into an HVAC controller. In other instances, methods and devices are described that allow an HVAC controller to predict Critical Peak Pricing (CPP) events, and control an HVAC system to modify energy consumption during the predicted CPP event time periods.

Figure 2:
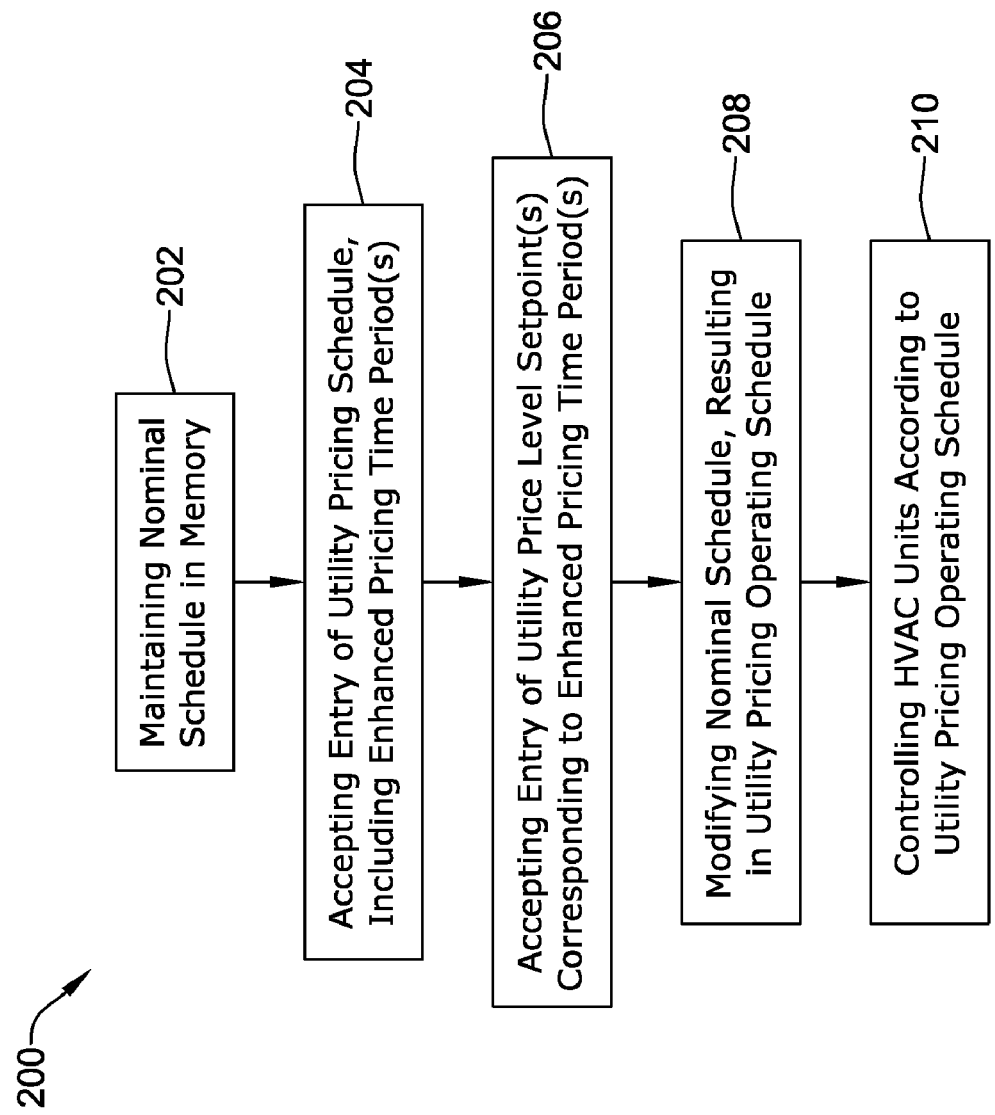
FIG. 2 is a flow diagram of an illustrative method for operating a utility-powered HVAC system including accepting entry via manual input of a utility pricing schedule.

FIG. 2 is a flow diagram of an illustrative method 200 for operating a utility-powered HVAC system, such as system 10 of FIG. 1. In block 202 a local HVAC controller may maintain in its memory a nominal schedule that is used to control the HVAC system during non-enhanced pricing periods. The nominal schedule may represent the normal programmable schedule of a programmable thermostat. The nominal schedule may, for example, be a 7 day programmable schedule (where each of the seven days of the week can have a separate schedule), a 5-2 programmable schedule (where the five week days have a common schedule, and the two weekend days have a common schedule), or any other schedule.

In some cases, the nominal schedule may have a number of days and one or more time periods for each of at least some of the days. In some instances, the nominal schedule may include a "sleep," a "wake," a "leave," and a "return" time period for each of the days of a week. The nominal schedule may have at least one setpoint associated with each of the one or more time periods. The nominal schedule may be maintained in the local HVAC controller's memory, and typically may be modified by an end user. The nominal schedule may be programmed using an interface such as one of those disclosed in U.S. Pat. No. 7,114,554, "CONTROLLER INTERFACE WITH MULTIPLE DAY PROGRAMMING," Bergman et al., which is hereby incorporated by reference in its entirety.

Method 200 includes receiving manual input via the user interface of the local HVAC controller. At block 204, it includes accepting entry of a utility pricing schedule that corresponds to scheduled price changes of a utility, including at least one enhanced pricing time period. In some illustrative embodiments, the utility pricing schedule is provided to the user by the utility. For example, the utility pricing schedule may be provided along with a monthly statement/bill, published in a newspaper, sent via electronic messaging such as in an email message or text message, made available on a website, and so on. In some illustrative embodiments, the utility pricing schedule may include at least one recurring enhanced pricing time period, which may recur weekly. In some illustrative embodiments, the utility pricing schedule may include at least two seasons, and enhanced pricing time periods may correspond to one of the seasons. At block 206, method 200 includes accepting entry of utility price level setpoints to correspond to each of the enhanced pricing time periods of block 204. Such setpoints may be chosen with the goal of reducing energy consumption (relative to the nominal schedule) during an enhanced pricing time period, often at the expense of comfort. More than one utility price level setpoint may be entered for each enhanced pricing time period. For example, there may be two, one for cooling and one for heating. In some illustrative embodiments, further setpoints may be entered. For example, different utility price level setpoints may be entered depending on whether an enhanced pricing time period occurs during an occupied period vs. an unoccupied period of the nominal schedule. Aspects of user interfaces that may be used to accept entry via manual input from a user of utility pricing schedules and utility price level setpoints are described in further detail elsewhere herein. Such disclosed user interface elements may be considered as extensions of the method 200 of FIG. 2.

Method 200 further includes at block 208, modifying or overriding the nominal schedule to include the utility pricing schedule entered at block 204 to result in a utility pricing operating schedule. In some illustrative embodiments, the utility pricing operating schedule may include time periods of the nominal schedule and setpoints associated with the time periods of the nominal schedule, except that during enhanced pricing time periods of the utility pricing schedule entered at block 204, during which the utility price level setpoints corresponding to the enhanced pricing time periods are in effect. At any given time, there may be only one setpoint in effect, which may be referred to as an operating setpoint, depending on the current mode (e.g., heating or cooling), season, time period, utility price level, and/or any other relevant HVAC or utility parameter.

In some illustrative embodiments, the step 208 of modifying or overriding the nominal schedule to include the utility pricing schedule may be performed such that the current operating setpoint at any or every given time during each of the enhanced pricing time periods is chosen to result in greatest economy, consistent with the current mode (heating or cooling) of the HVAC system. This may result in the current operating setpoint being either the utility pricing level setpoint for the current enhanced pricing time period, or the setpoint of the nominal schedule, whichever is most economical. The following non-limiting example may elucidate this setpoint selection condition: During the cooling season, an enhanced pricing time period from 8:00 am to 5:00 pm has a utility price level setpoint of 82° F. Prior to 8:00 am, the nominal "wake" time period setpoint is 78° F., so prior to 8:00 am, the current operating setpoint is 78° F. At 8:00 am, the enhanced pricing time period commences, and the current operating setpoint changes to the utility price level setpoint of 82° F., which is more economical than 78° F. At 8:30 am, the nominal schedule switches from "wake" to "leave," for which the nominal setpoint is 85° F. Thus, at 8:30 am, the current operating setpoint changes to the nominal "leave" setpoint of 85° F., which is more economical than the utility price level setpoint of 82° F. of the current enhanced pricing time period. At 4:00 pm, the nominal schedule switches from "leave" to "return," for which the nominal setpoint is 78° F. Now the utility price level setpoint of 82° F., being more economical than 78° F., is the current operating setpoint. At 5:00 pm, when the enhanced pricing time period ends, the nominal "return" setpoint of 78° F. becomes the current operating setpoint.

The immediately preceding example also illustrates a procedure for determining current operating setpoints that may be practiced in some illustrative embodiments. At every start time of either a time period of the nominal schedule or a enhanced pricing time period, a comparison may be made between the setpoint of the current time period of the nominal schedule (for the current mode, either heating or cooling) and the utility price level setpoint (heating or cooling) corresponding to the current enhanced pricing time period. From that comparison, the most economical setpoint is selected as the current operating setpoint at that start time. Note that in this method, the utility price level "setpoints" may also be regarded as "setpoint limits," in that they provide a limit to how much cooling or heating will be provided during enhanced pricing time periods.

At block 210, the method 200 includes controlling one or more HVAC units of the HVAC system with the local HVAC controller in accordance with the utility pricing operating schedule of block 208.

In some illustrative embodiments of a method, like method 200 for operating a utility-powered HVAC system, each schedule price change of a utility may be associated with a utility price level, such as Off-Peak, Mid-Peak, High-Peak, etc., such that each enhanced pricing time period has an associated or corresponding enhanced utility price level (and non-enhanced pricing time periods may correspond to, for example, an Off-Peak utility price level). Furthermore, at least one utility price level setpoint may be entered, defined, or otherwise set to associate with or correspond to each of the utility price levels. For example, a cooling utility price level setpoint of 85° F. and a heating utility price level setpoint of 62° F. may be entered and associated with Mid-Peak pricing, and setpoints of 90° F. (cooling) and 57° F. (heating) may be entered and associated with High-Peak pricing.

FIGS. 3-13 show an illustrative but non-limiting example of an HVAC controller 300 that may be similar to HVAC controller 12 of FIG. 1. HVAC controller 300, which may be a thermostat, may be used to practice methods of the present disclosure, including method 200 of FIG. 2, and/or other appropriate methods. Furthermore, descriptions herein of user interface elements of HVAC controller 300 may be considered to extend method 200 and other methods of the present disclosure where they are compatible.

Figure 3:
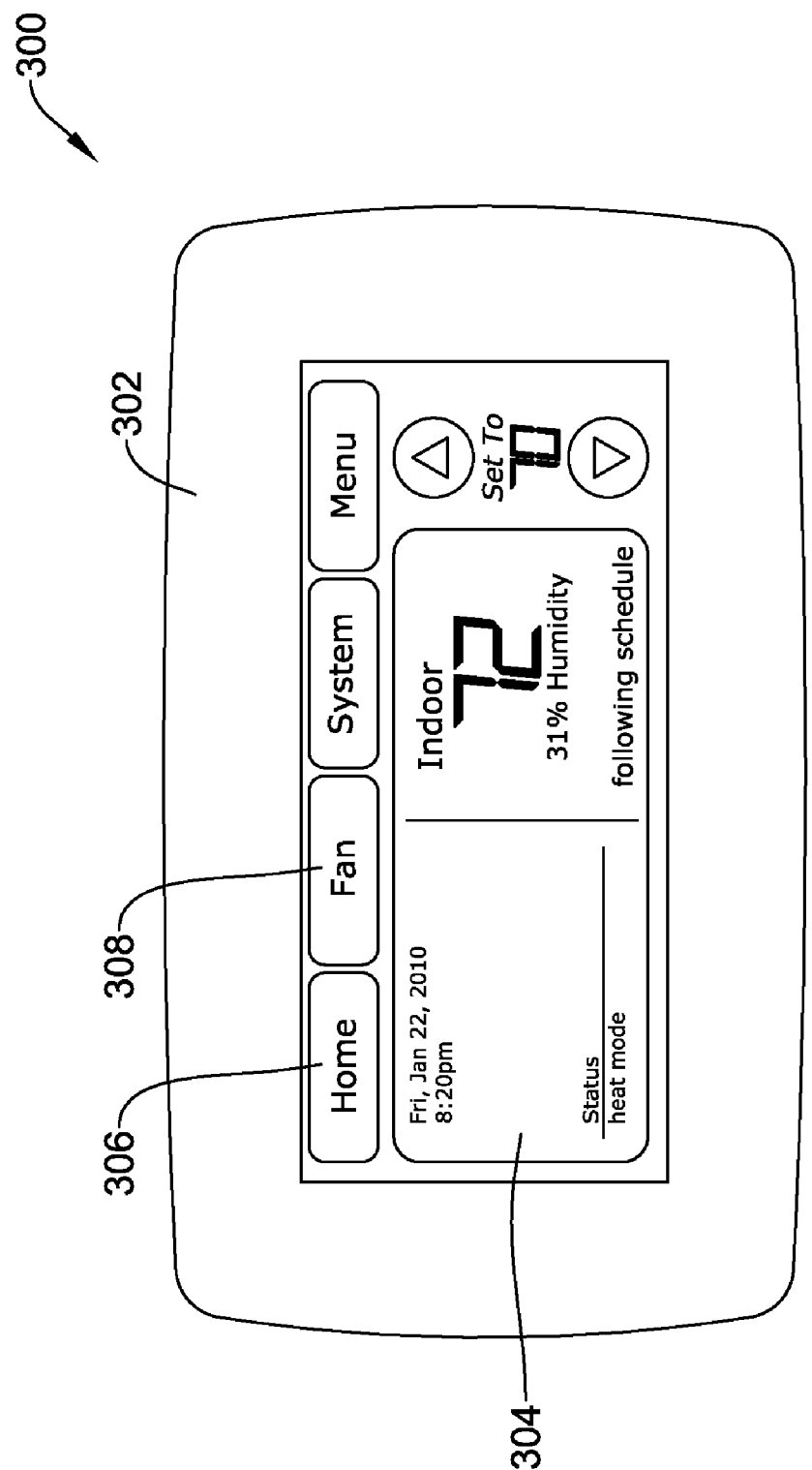
FIG. 3 shows an illustrative example of an HVAC controller that may be used in an HVAC system like that of FIG. 1 and that may be used to practice the method of FIG. 2.

As shown, HVAC controller 300 may include a housing 302 and a display 304. Display 304 may be a touchscreen display, and it may be a liquid crystal display (LCD), although neither of these are required. FIG. 3 shows HVAC controller 300 with a default "home" screen presented on display 304. Buttons, such as HOME button 306 and FAN button 308, may be shown on touchscreen display 304. In some other illustrative embodiments, an HVAC controller may include one or more physical buttons, in some cases associated with labels on a display (as with so-called "soft" buttons), and/or in some cases with dedicated functions. More generally, it is contemplated that any suitable user interface may be used, as desired.

Figure 4:
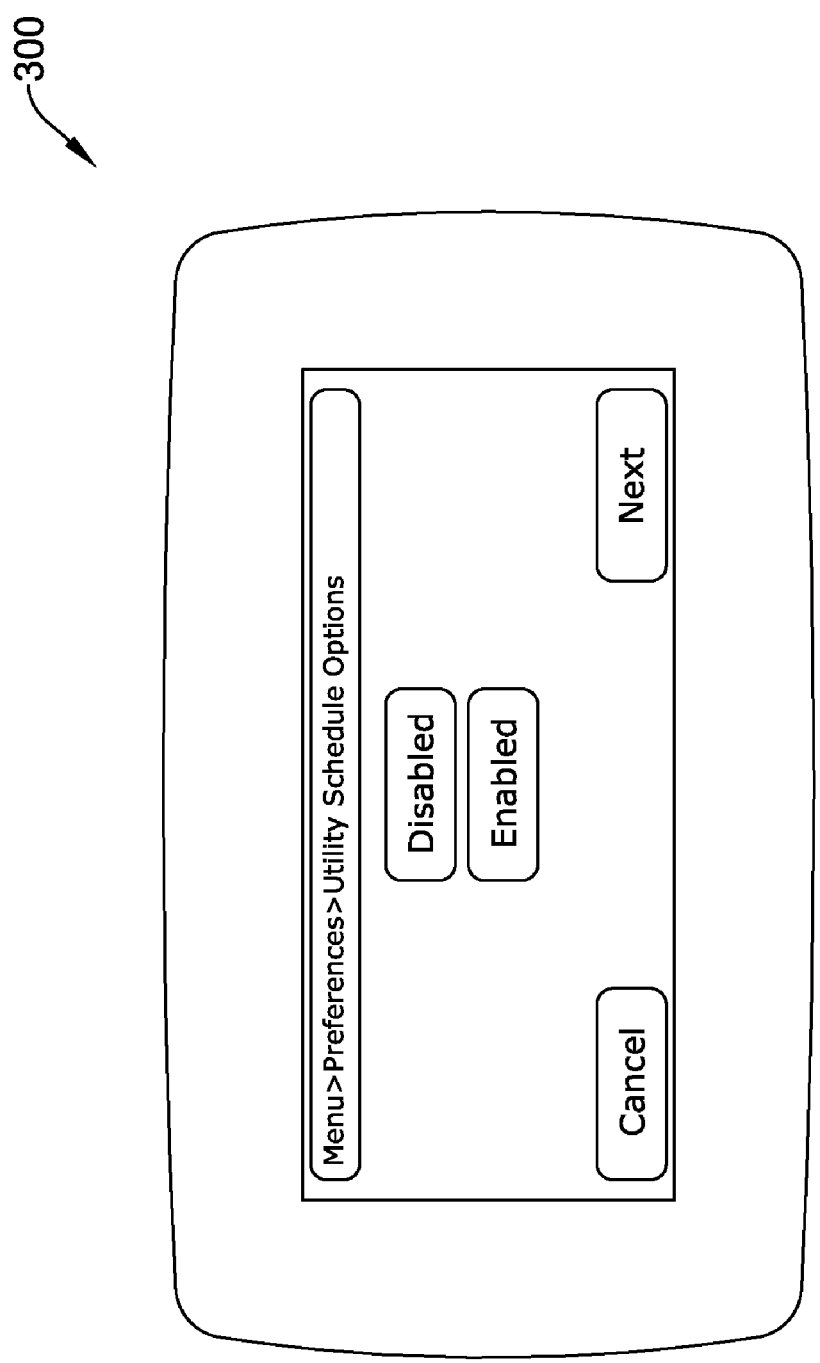
FIG. 4 shows the illustrative HVAC controller of FIG. 3 configured to allow a user to disable or enable a utility pricing operating schedule.

FIG. 4 shows the illustrative HVAC controller of FIG. 3 configured to allow a user to disable or enable a utility pricing operating schedule, such as the utility pricing operating schedule of method 200. When disabled, the HVAC controller 300 may control one or more HVAC units of an HVAC system in accordance with the nominal schedule of method 200. When enabled, the HVAC controller 300 may control one or more HVAC units of an HVAC system in accordance with the utility pricing operating schedule of method 200.

Figure 5:
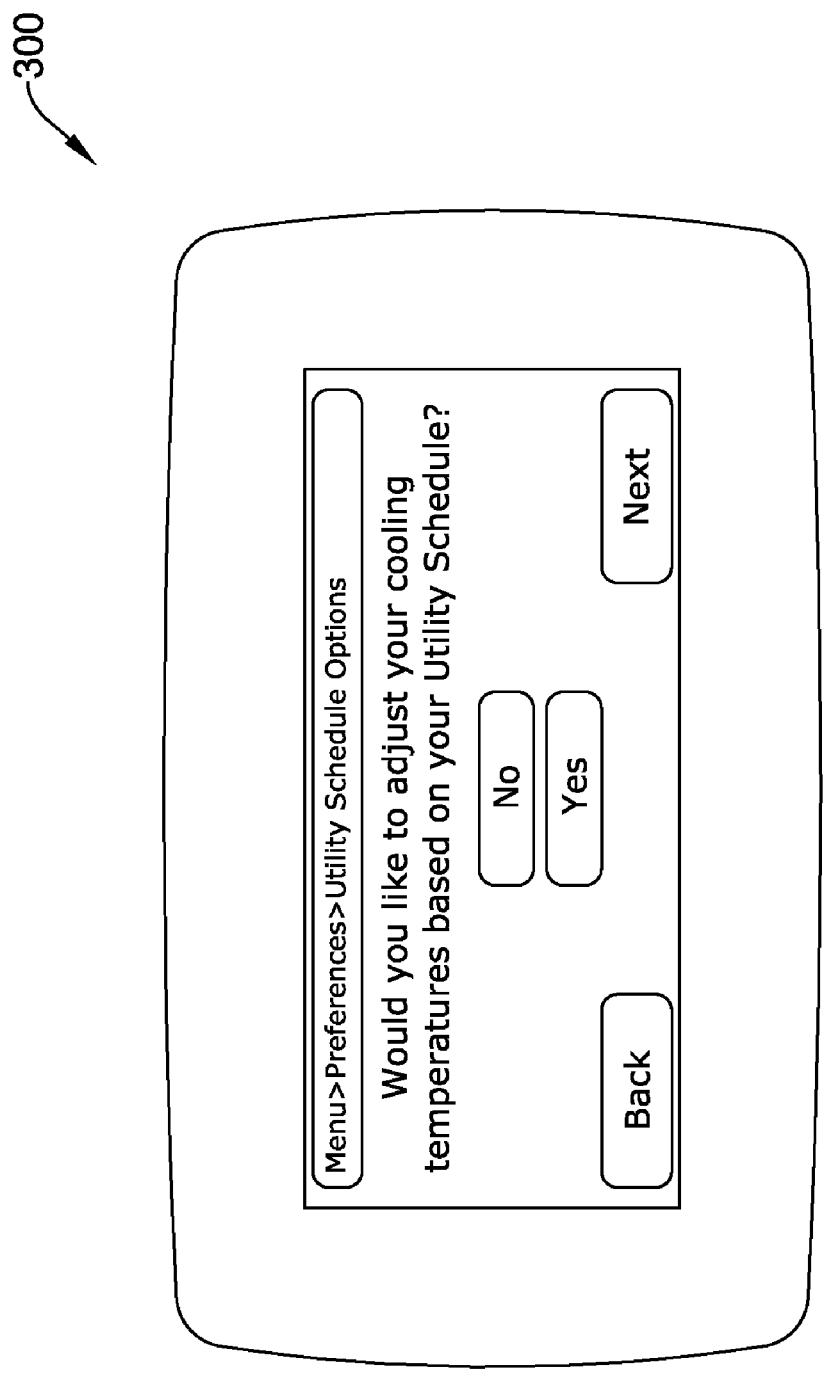
FIG. 5 shows the illustrative HVAC controller of FIG. 3 querying whether cooling temperatures are to be adjusted based on a utility pricing schedule.
Figure 6:
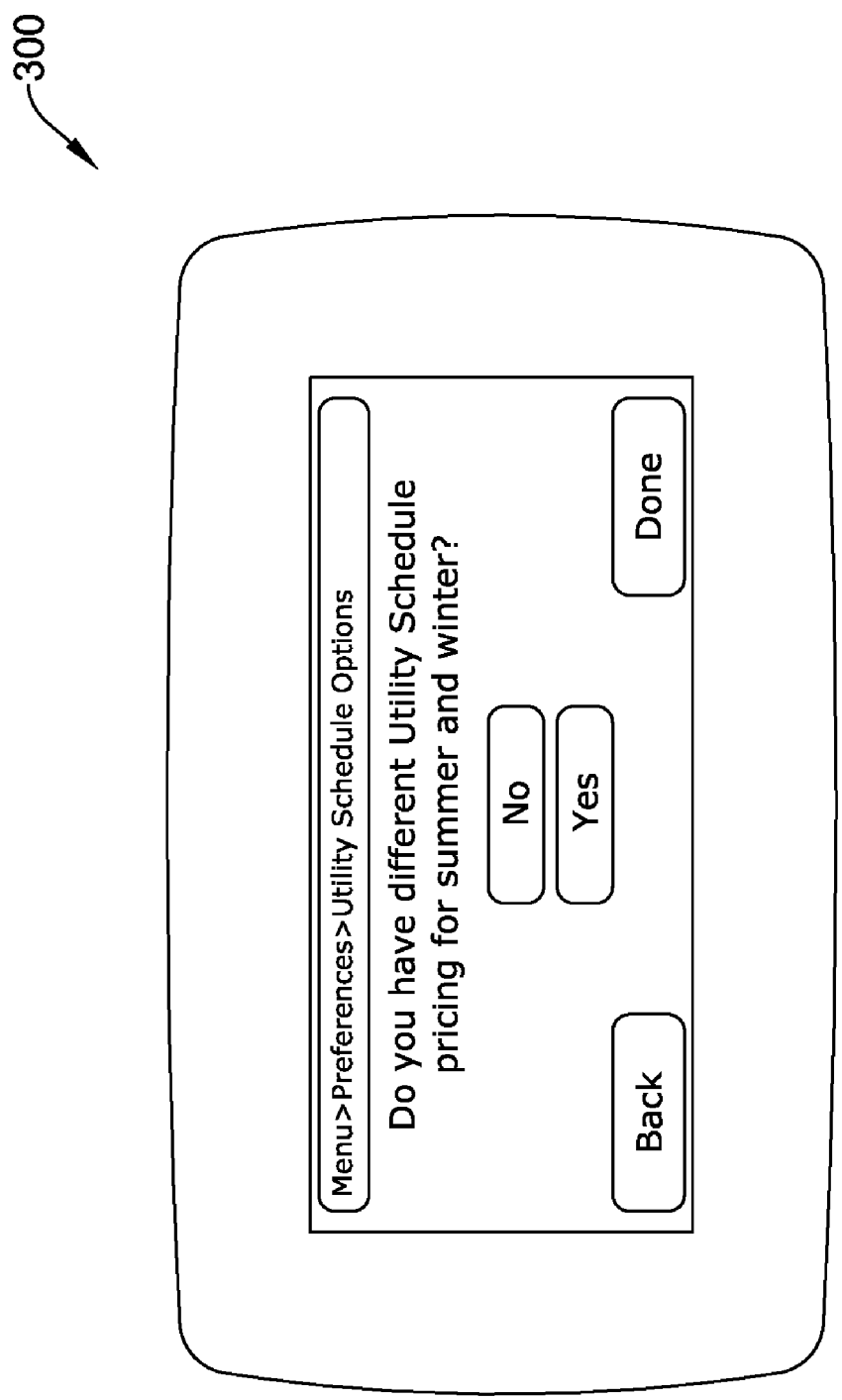
FIG. 6 shows the illustrative HVAC controller of FIG. 3 querying whether different seasonal pricing exists for a utility pricing schedule.

When the use of a utility pricing operating schedule is enables via the screen shown in FIG. 4, the user interface may follow by prompting and allowing entry of other parameters relating to the use of the utility pricing operating schedule. For example, if the user selects the "Next" button in FIG. 4, the HVAC controller 300 may advance to the screen shown in FIG. 5. FIG. 5 shows the illustrative HVAC controller 300 querying whether cooling temperatures are to be adjusted based on a utility pricing schedule. The user interface may similarly allow a user to select whether heating temperatures are to be adjusted based on a utility pricing schedule (not shown). Subsequent prompts by and entries into the user interface may be scripted based upon user inputs, such as in response to these and other queries. FIG. 6 shows another query that may allow the user interface to tailor later prompts to a particular utility scheduling scenario, in this case determining whether different seasonal pricing exists for a utility pricing schedule.

Figure 7:
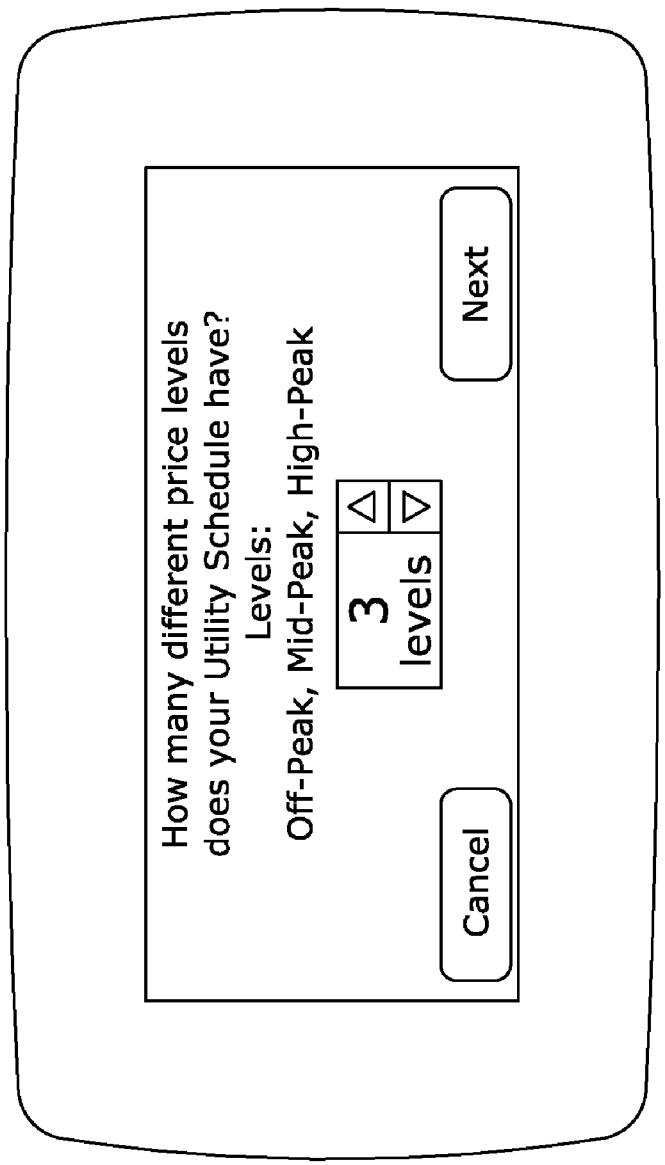
FIG. 7 shows the illustrative HVAC controller of FIG. 3 configured to allow entry of a number of utility price levels.
Figure 8:
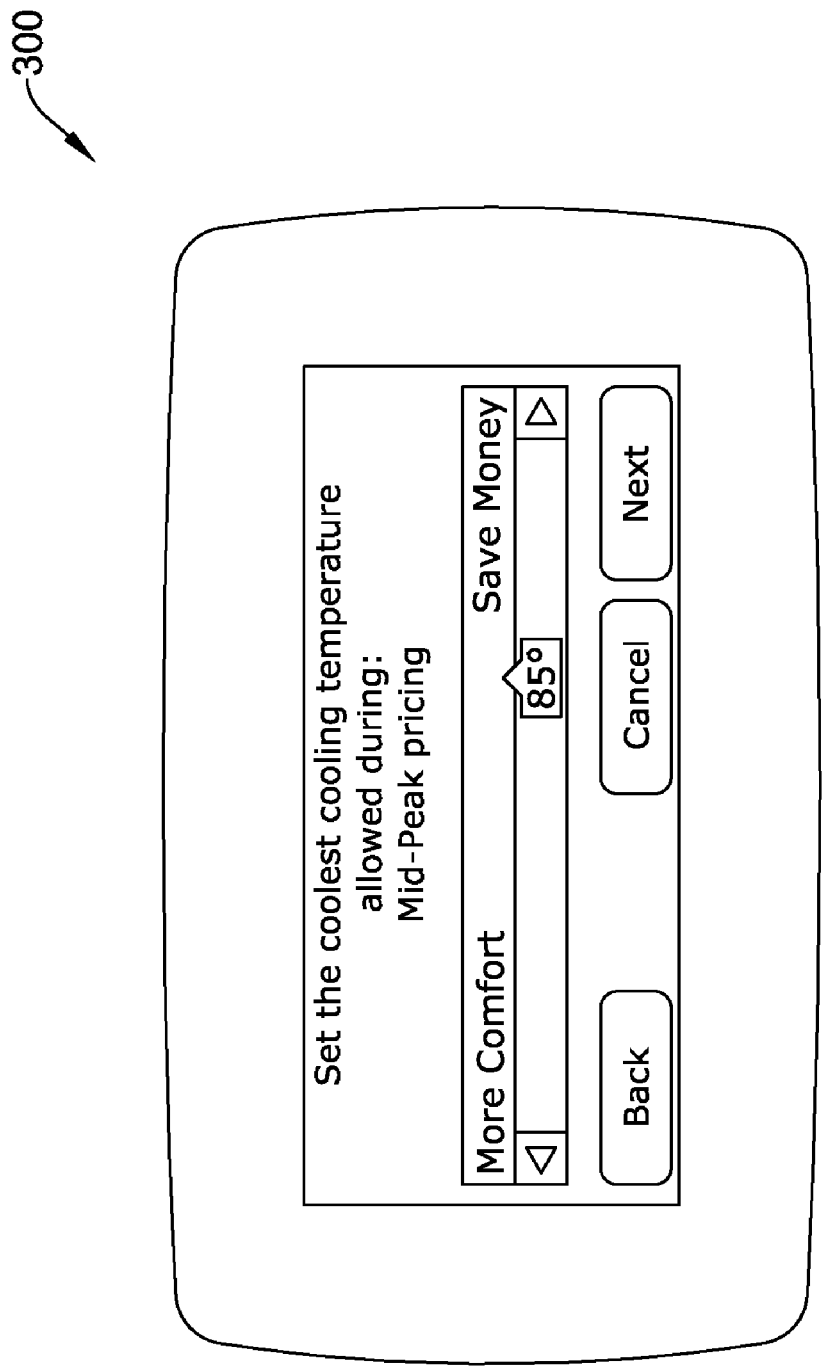
FIG. 8 shows the illustrative HVAC controller of FIG. 3 configured for entry of a utility pricing level setpoint.

FIG. 7 shows the user interface configured to allow entry of a number of utility price levels or tiers in a utility pricing schedule. A utility pricing schedule may have two (for example, Off-Peak and High Peak), three (Off-Peak, Mid-Peak, and High-Peak, as shown), four (Off-Peak, Low-Peak, Mid-Peak, and High-Peak), or any other appropriate number of utility price levels. In FIG. 8, the user interface is shown configured for entry or setting of a utility pricing level setpoint. In the case shown, a cooling setpoint is being entered to correspond to or associate with the Mid-Peak utility price level, and accordingly, corresponds to or is associated with enhanced pricing time periods associated with the Mid-Peak utility price level. Similar user interface displays may be used for entry or setting of heating setpoints, and for other utility price levels (e.g., Low-Peak and High-Peak). In some illustrative embodiments, other appropriate HVAC parameters may be entered and associated with utility pricing levels, such as humidity setpoints, fan settings, etc.

Figure 9:
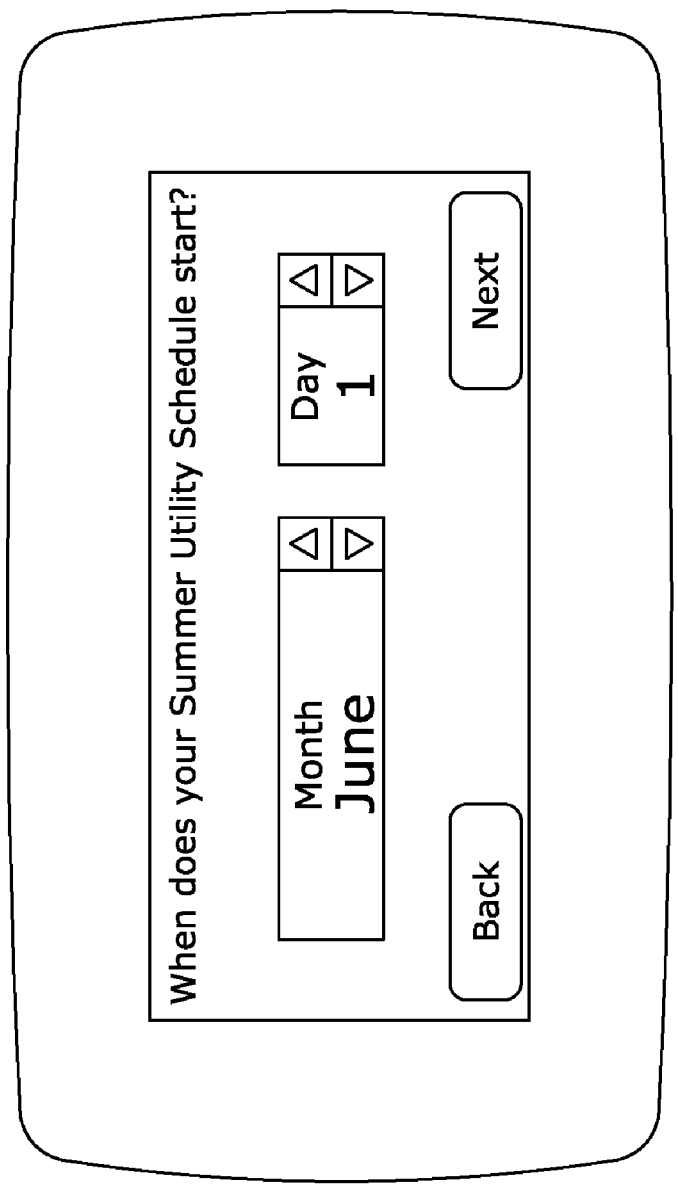
FIG. 9 shows the illustrative HVAC controller of FIG. 3 configured to accept entry of a seasonal start date of a utility pricing schedule.
Figure 10:
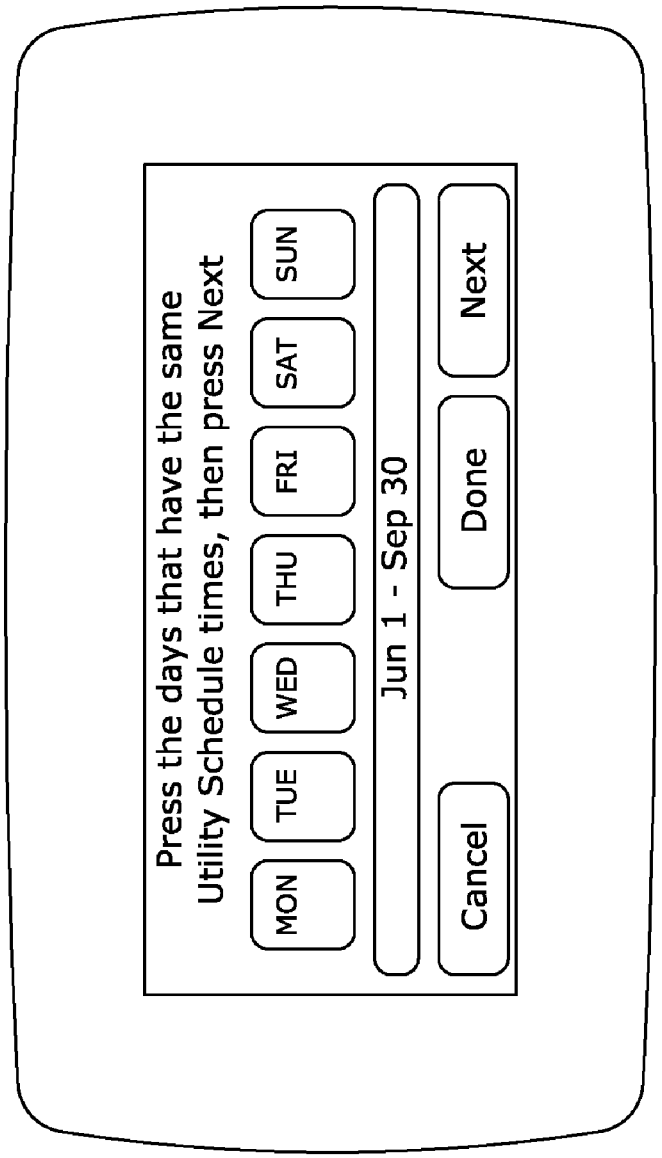
FIG. 10 shows the illustrative HVAC controller of FIG. 3 configured to accept selection of days of the week for inclusion in a group of days for a utility pricing schedule.

In FIG. 9, the user interface is shown configured to accept entry of a seasonal start date of a utility pricing schedule. A similar user interface may be used to accept entry of other relevant dates for a utility pricing schedule. In FIG. 10, the user interface is shown configured to accept selection of days of the week for inclusion in a group of days, where enhanced pricing time periods will recur each day of the group of days, and also weekly on those days during the season the enhanced pricing time periods are associated with or correspond to (in this case, Summer).

Figure 11:
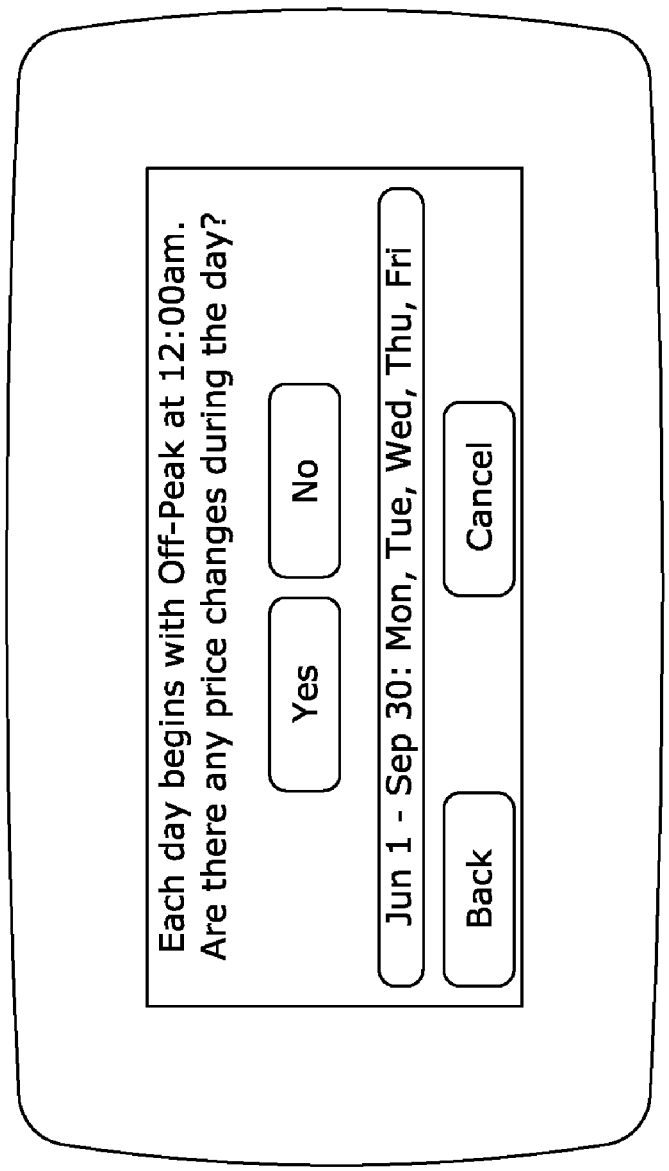
FIG. 11 shows the illustrative HVAC controller of FIG. 3 querying whether there are any utility price level changes during a day.
Figure 12:
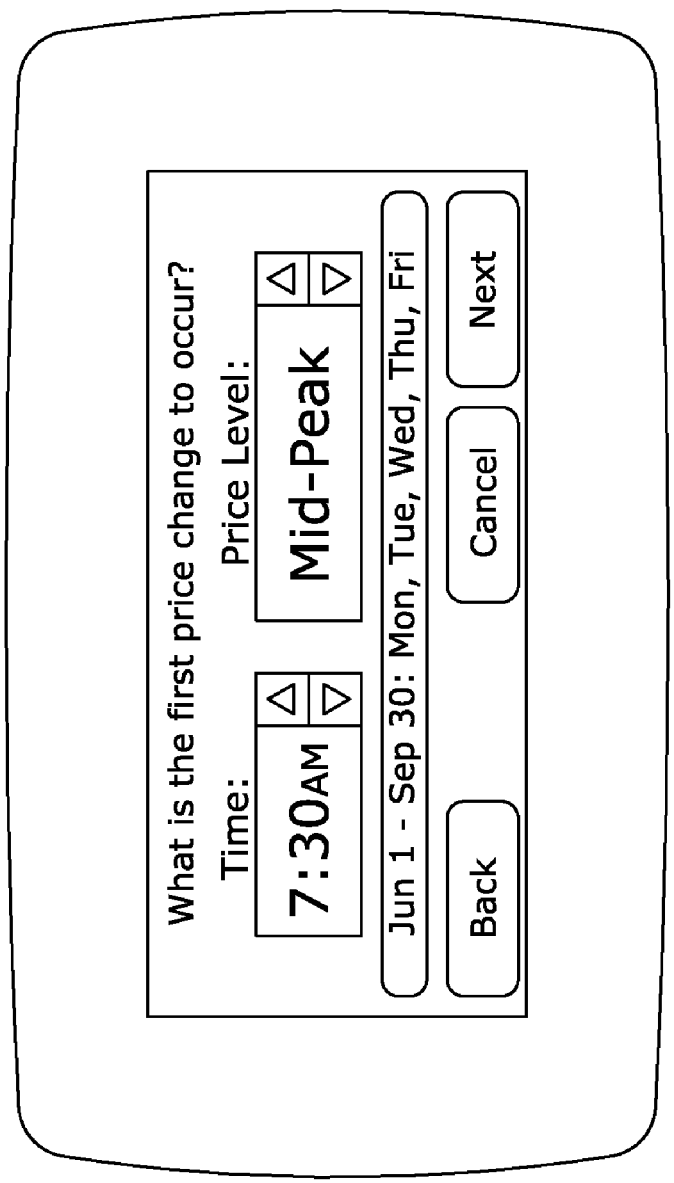
FIG. 12 shows the illustrative HVAC controller of FIG. 3 querying for when a first price change is to occur.

FIG. 11 shows the user interface querying whether there are any utility price level changes (from a nominal Off-Peak price level) during a day. After selection of "Yes," the user interface moves on, as shown in FIG. 12, to allow entry of the time of the first scheduled price change and the utility price level at that time. After this entry is completed, the user interface may query whether there is a subsequent utility price level change (similarly to that shown in FIG. 11), and if so, allow entry of the time of the subsequent price change and the utility price level at that time (similarly to that shown in FIG. 12). This process may repeat until all utility price level changes during the day have been entered.

Figure 13:
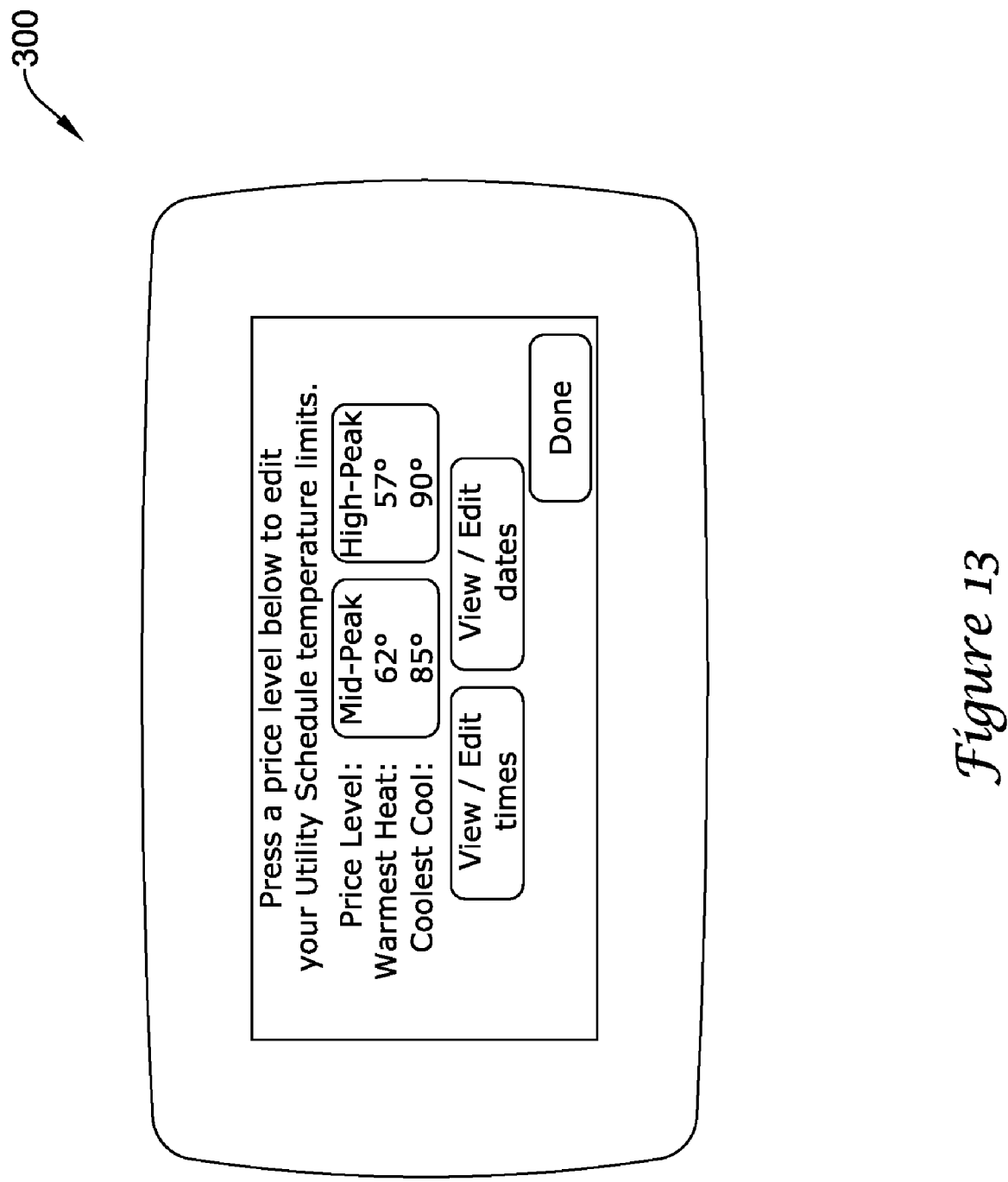
FIG. 13 shows the illustrative HVAC controller of FIG. 3 showing the currently set temperature setpoint limits for various price levels.

After the utility price level changes for the days in a group of days selected in FIG. 10 have been entered, the user interface may allow a user to schedule utility price level changes for other days that may form one or more other groups of days, using the same or similar user interface elements shown in FIGS. 10-12, and also for days and/or groups of days during other seasons. The user interface may also allow review of a utility pricing schedule. FIG. 13 shows a screen from which a user may review and/or edit utility pricing schedule and utility price level setpoints.

Other user interface arrangements are possible. For example, after entry of a scheduled price change as in FIG. 12, rather than querying whether there is a subsequent utility price level change to enter, the user interface may be configured such that it queries for the total number of price changes per day at the outset before it accepts entry of parameters for any of the scheduled price changes. After accepting entry of the total number of price changes, the user interface could then prompt for and accept entry of the first price change, second price change, etc. Many user interface variations are contemplated for entry of utility price schedules.

In some illustrative embodiments, the utility pricing operating schedule may only include time periods and setpoints defined either in the nominal schedule or those entered as part of a utility pricing schedule, such as in blocks 204 and 206 of method 200. However, in some illustrative embodiments, the utility pricing operating schedule may include time periods and setpoints other than those in the nominal schedule or those entered in blocks 204 and 206, if desired. In some illustrative embodiments, for example, a utility pricing operating schedule may include a pre-cooling time period (in a season or on a day when HVAC cooling is desired; analogously, a pre-heating time period for when HVAC heating is desired). A pre-cooling time period may be scheduled before an enhanced pricing time period, when rates are lower than during the subsequent enhanced pricing time period, and in some cases, may include a cooler setpoint than normally would be controlled-to (at that time) according to the nominal schedule. The use of pre-cooling may allow greater comfort to be achieved during enhanced pricing time periods while still reducing energy consumption during the enhanced pricing time periods. An HVAC controller such as HVAC controller 12 of FIG. 1 may be configured to incorporate pre-cooling into a utility pricing operating schedule. In some cases, pre-cooling may be offered as an option that is selectable by, for example, an end user or an HVAC technician. Parameters for pre-cooling may be selected or otherwise determined in any suitable way. For example, parameters for pre-cooling may be user selectable via the user interface. Such parameters may include pre-cooling temperature limits or bounds, time parameters for pre-cooling time periods, and/or any other appropriate parameters. In some illustrative embodiments, an end user may simply enter a preference whether or not to use pre-cooling, and if pre-cooling is desired, the HVAC controller may be configured to add one or more pre-cooling time periods to a utility pricing operating schedule without further user input.

Figure 14:
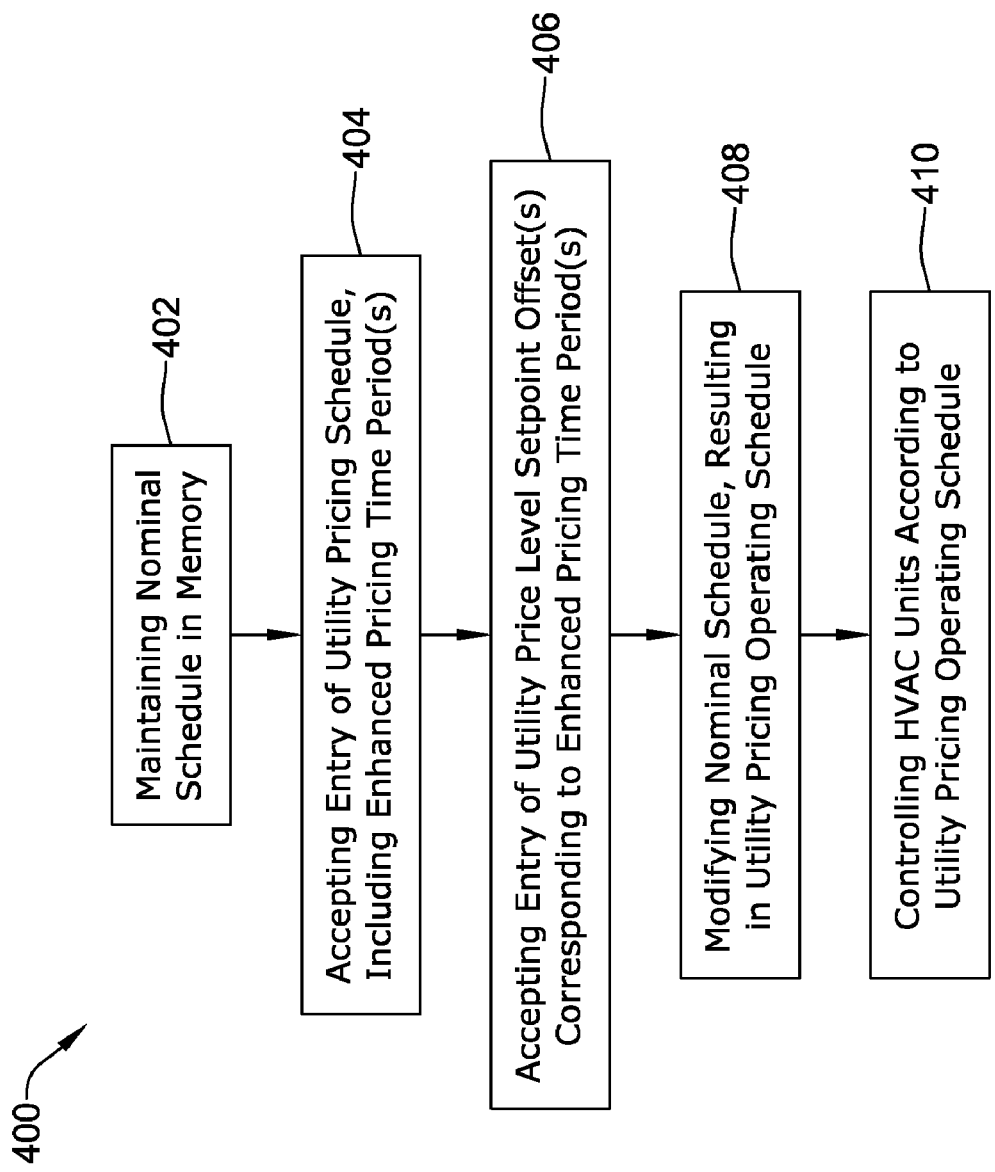
FIG. 14 is a flow diagram of another illustrative method for operating a utility-powered HVAC system including accepting entry via manual input of a utility pricing schedule.

The present disclosure contemplates additional ways for obtaining utility pricing operating schedules from modification of nominal schedules. For example, FIG. 14 is a flow diagram of another illustrative method 400 for operating a utility-powered HVAC system, including accepting entry via manual input of a utility pricing schedule. Method 400 is similar in many ways to method 200 of FIG. 2, and substantial portions of the description of method 200 are relevant to method 400. These include the discussions regarding maintaining a nominal schedule in memory of an HVAC controller at 202 and 402, and accepting entry of a utility pricing schedule at 204 and 404.

Method 400 differs from method 200 at block 406, where method 400 includes accepting entry of utility price level setpoint offsets that correspond to the enhanced pricing time periods entered at step 404. Generally, setpoint offsets may be combined with (added to or subtracted from) a first setpoint to result in a second setpoint. At block 408, setpoint offsets entered at block 406 may be used in the step of modifying or overlaying the nominal schedule to include the setpoint offsets, resulting in a utility pricing operating schedule.

In some illustrative embodiments, operating setpoints for a utility pricing operating schedule may be obtained by the following method: When there is no enhanced pricing time period in effect, a setpoint of the current time period of the nominal schedule may be used as the operating setpoint. During an enhanced pricing time period (e.g. when the current time period of the nominal schedule overlaps with the enhanced pricing time period), a utility price level setpoint offset may be added to the current setpoint of the nominal schedule, resulting in a new operating setpoint. To further elucidate this method, an example is discussed elsewhere herein in connection with FIGS. 15-19. Method 400 continues at block 410 by controlling one or more HVAC units with the local HVAC controller in accordance with the utility pricing operating schedule.

FIGS. 15-19 show an illustrative but non-limiting example of an HVAC controller 500. HVAC controller 500, which may be a thermostat, may be used to practice methods of the present disclosure, including method 400 of FIG. 14, and/or other appropriate methods. HVAC controller 500 may be essentially the same as HVAC controller 300 of FIGS. 3-13, and may be able to practice method 200 of FIG. 2 as well as method 400 of FIG. 4, if desired. Furthermore, either of HVAC controllers 300 and 500 may be reconfigurable to practice different or new methods, such as via a software update, software activation, or any other suitable reconfiguration method.

Figure 15:
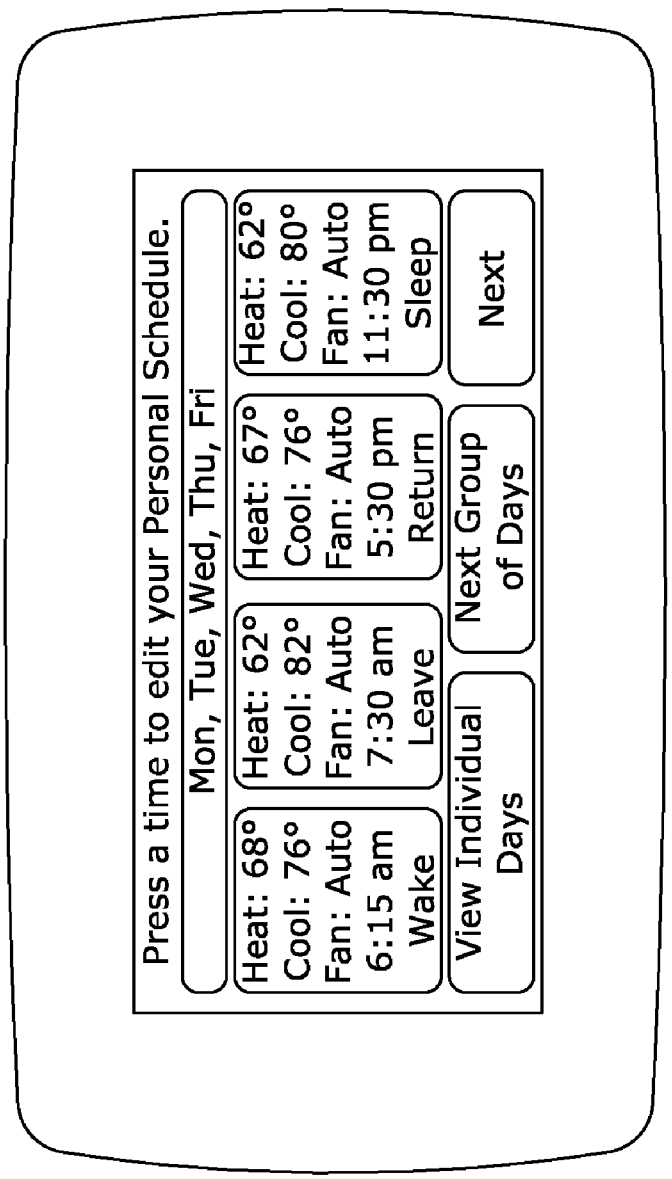
FIG. 15 shows another illustrative HVAC controller that may be used in an HVAC system like that of FIG. 1, configured in a nominal schedule review/edit mode.
Figure 16:
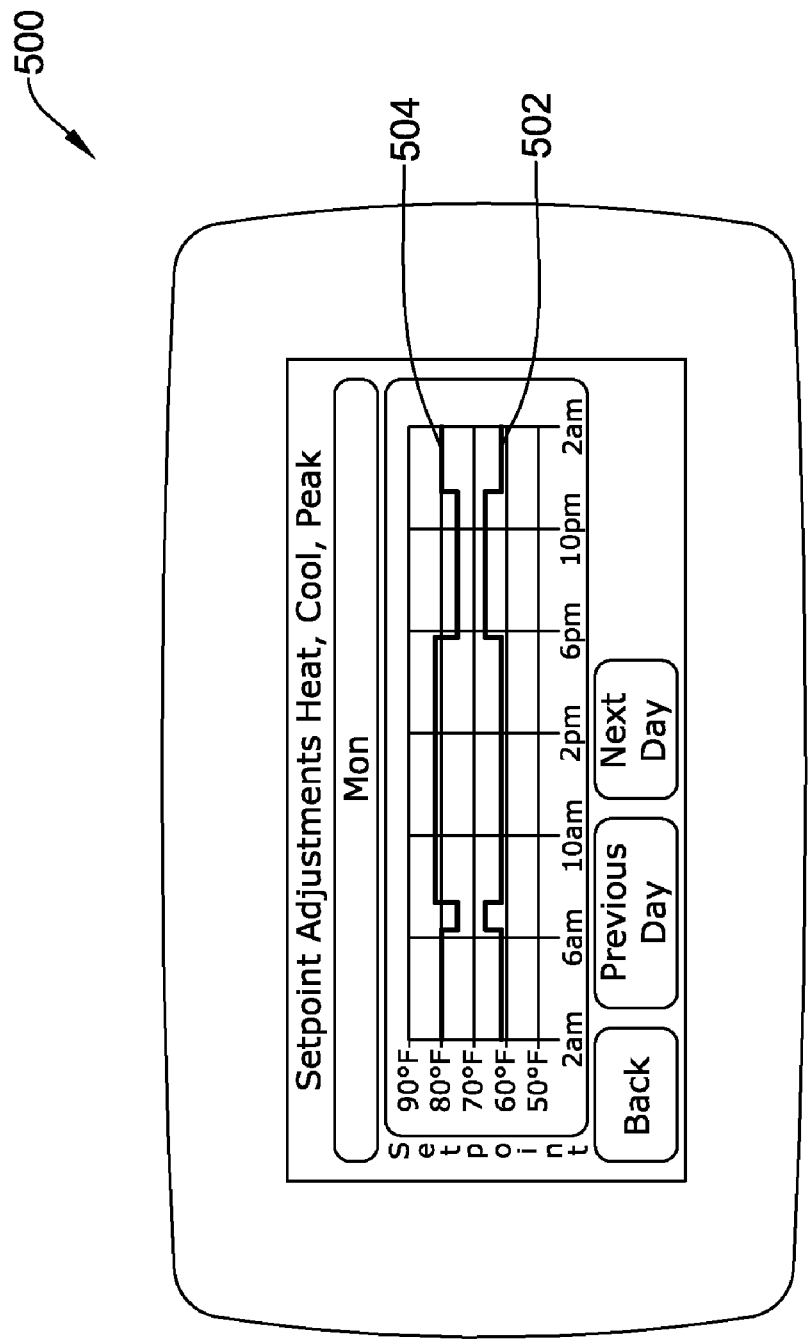
FIG. 16 shows the illustrative HVAC controller of FIG. 15 displaying heating and cooling setpoints of a nominal schedule in a graphical format.

FIG. 15 shows the user interface of HVAC controller 500 configured in a nominal schedule review and edit mode, as may be practiced in an HVAC control method of the present disclosure. HVAC parameters for WAKE, LEAVE, RETURN, and SLEEP time periods are shown. FIG. 16 shows the user interface displaying heating (bottom trace 502) and cooling (top trace 504) setpoints for the time periods of FIG. 15 graphically in a 24 hour time interval.

Figure 17:
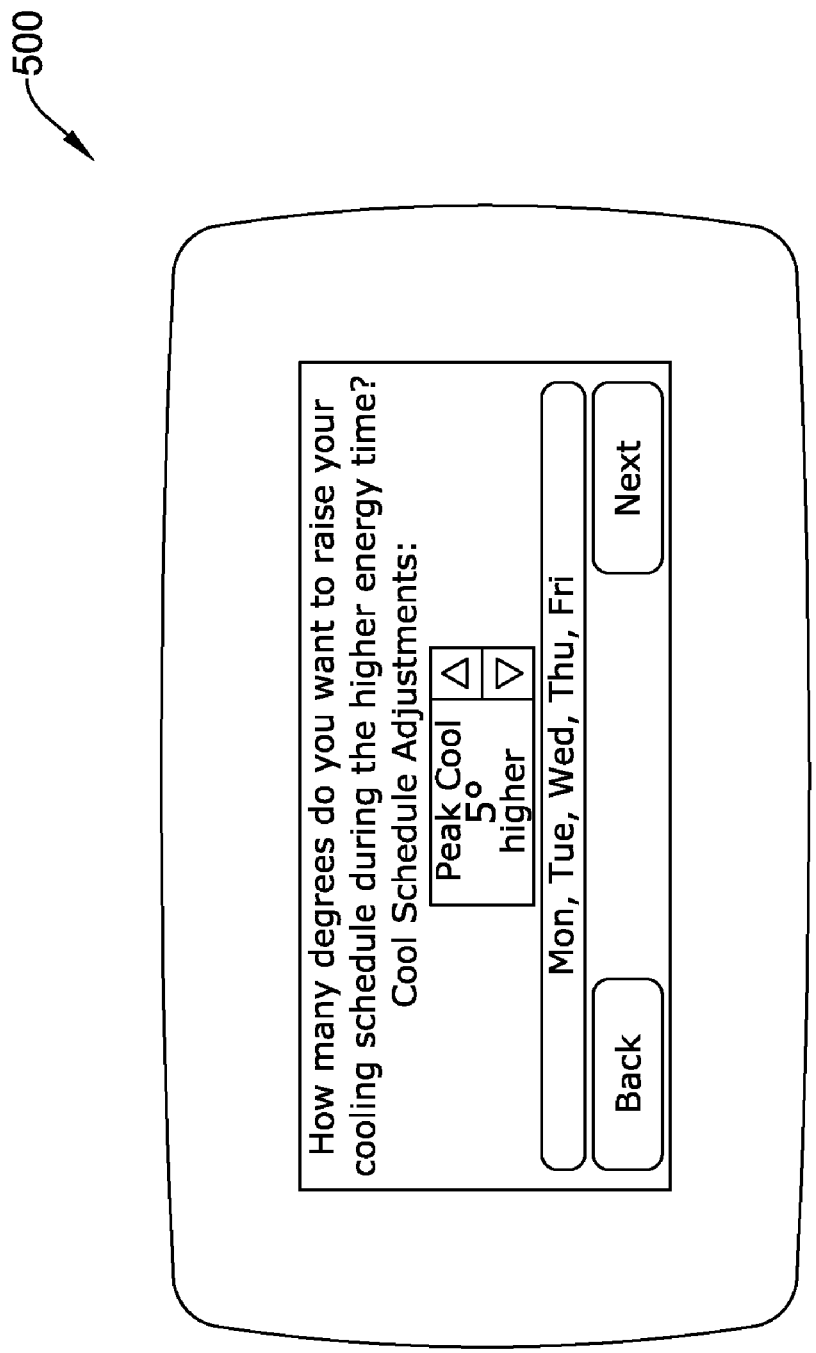
FIG. 17 shows the illustrative HVAC controller of FIG. 15 configured to allow entry of a utility price level setpoint offset.
Figure 18:
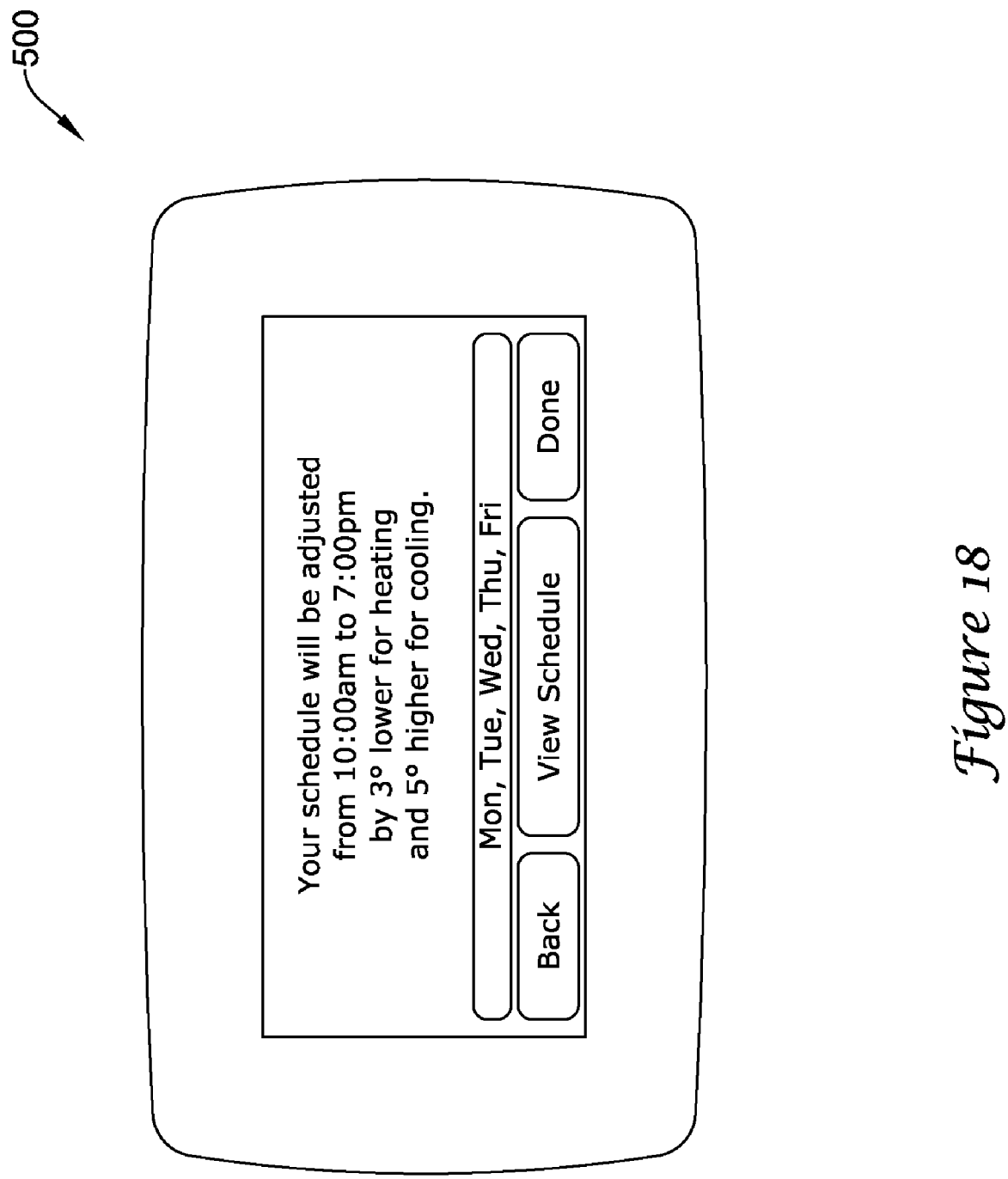
FIG. 18 shows the illustrative HVAC controller of FIG. 15 displaying a summary of parameters for an enhanced pricing time period.
Figure 19:
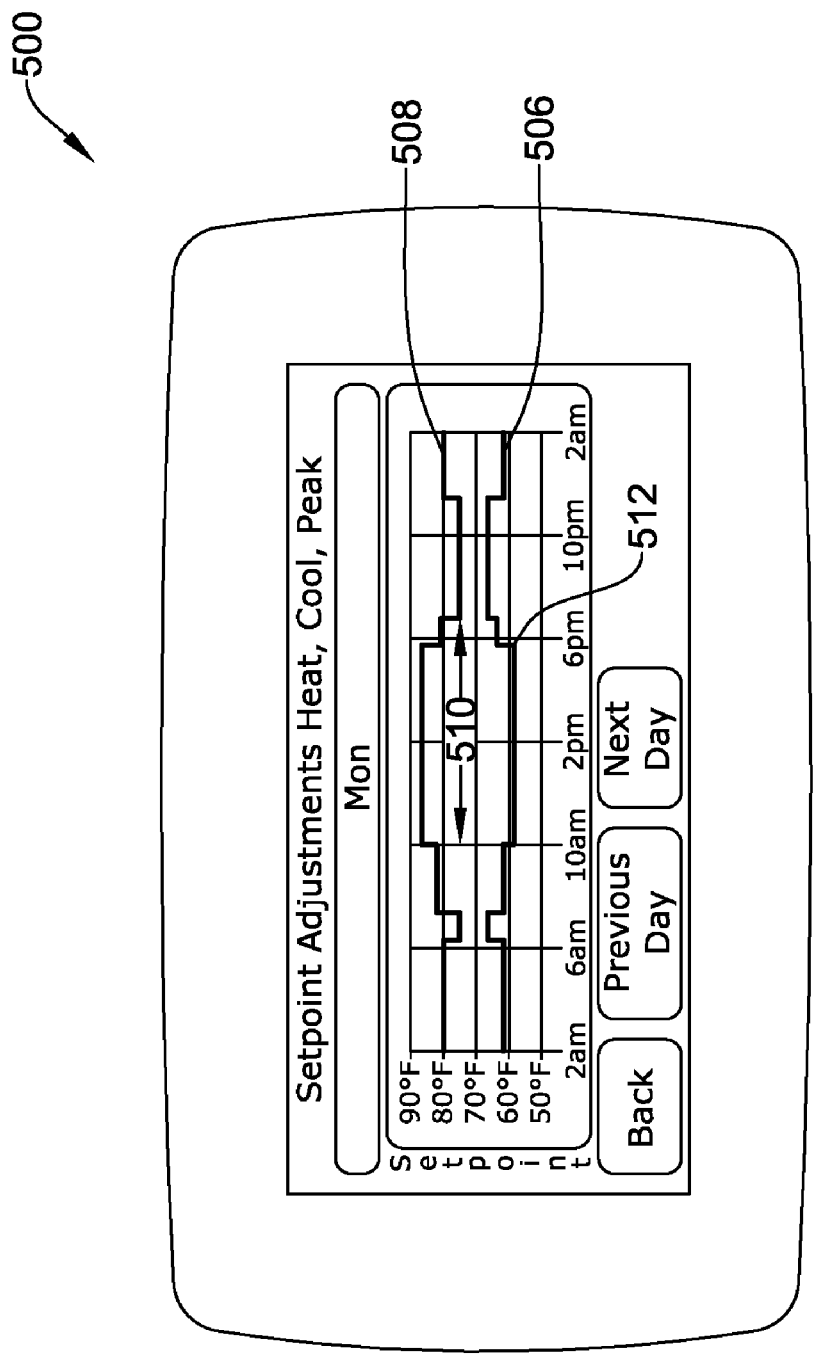
FIG. 19 shows the illustrative HVAC controller of FIG. 15 displaying heating and cooling operating setpoints of a utility pricing operating schedule in a graphical format.

FIGS. 17-19 particularly illustrate aspects of method 400 of FIG. 14. For example, FIG. 17 shows the user interface configured to accept entry of a cooling utility price level setpoint offset for an enhanced pricing time period. FIG. 18 shows the user interface displaying a summary of parameters for an enhanced pricing time period. In this example, for the sake of simplicity and without loss of generality, there is a single enhanced pricing time period for weekdays from 10:00 am to 7:00 pm. In general, an arbitrary number of enhanced pricing time periods may be scheduled. FIG. 19 shows the user interface displaying heating 506 and cooling 508 operating setpoints of a utility pricing operating schedule, with offsets applied. For example, during the enhanced pricing time period 510, from 10:00 am to 7:00 pm, the operating setpoints 506, 508 are seen to be offset by +5° F. for cooling and −3° F. for heating, per the parameters set in FIG. 18, and in comparison with the setpoints 502, 504 of the nominal schedule shown in FIG. 16. Note that at 5:30 pm (marked at 512), when the nominal schedule changes from "LEAVE" to "RETURN," the offset operating setpoints 506, 508 change as they follow (with offsets) the changing setpoints 502, 504 of the nominal schedule.

Figure 20:
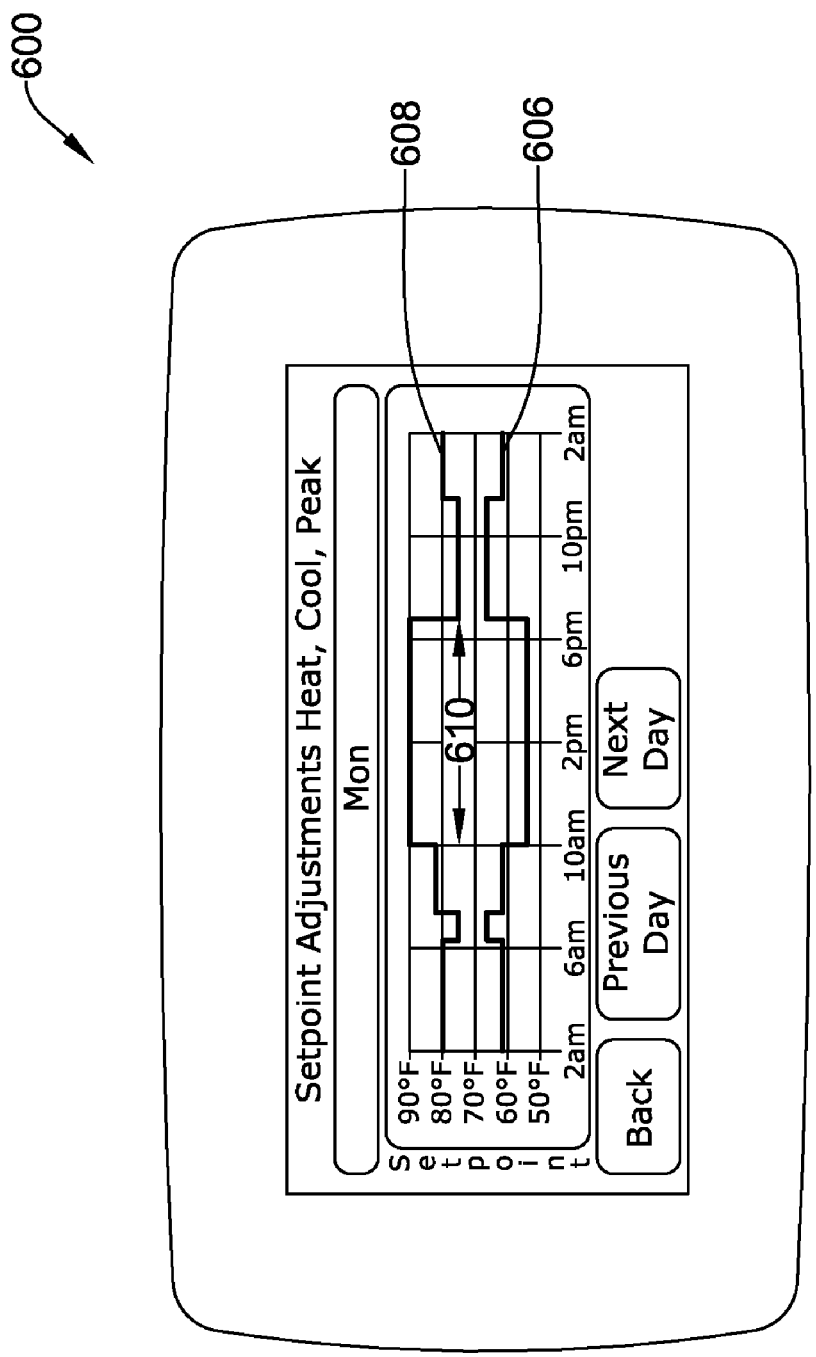
FIG. 20 shows another illustrative HVAC controller displaying heating and cooling operating setpoints of a utility pricing operating schedule in a graphical format.

In comparison, FIG. 20 shows another illustrative HVAC controller 600 displaying heating and cooling operating setpoints of a utility pricing operating schedule in a graphical format. In this example, for the sake of simplicity and without loss of generality, there is a single enhanced pricing time period 610 for weekdays from 10:00 am to 7:00 pm with a heating utility price level setpoint of 55° F. and a cooling utility price level setpoint of 90° F. The nominal schedule underlying the utility pricing operating schedule in this example is the same as the nominal schedule of the example of FIGS. 15-19, but during enhanced pricing time period 610, the setpoints of the nominal schedule are irrelevant and overridden by the heating and cooling utility price level setpoints (and not merely by an offset).

The present disclosure contemplates further avenues for entering a utility pricing schedule into an HVAC controller. An HVAC controller may include a capability for interfacing with information storage media or devices, such as flash memory devices having any suitable interface, such as Universal Serial Bus (USB), SD and SD variants, and so on. Such an information storage device may be used to enter a utility pricing schedule into an HVAC controller that is configured to accept the schedule from the device. An information storage device with a utility pricing schedule could be provided directly from utility, or a utility pricing schedule could be written to an information storage device by an HVAC system user. The user could, for example, download an electronic file encoding a utility pricing schedule via an information network such as the internet to a desktop, laptop, or any other appropriate computer or computing device, then write the file on the local computer to an information storage device, such as a flash memory device. Alternately, a computer or computer device may be communicatively connected to an HVAC controller via a wired, wireless, optical, or other type of connection, allowing transfer of a utility pricing schedule to the HVAC controller. Alternately or in addition, the computer could execute application code providing a utility pricing schedule editor (which may be considered an element of the user interface of the HVAC controller) that could write an electronic file encoding a utility pricing schedule to an information storage device. The utility pricing schedule may include enhanced pricing time periods and utility pricing levels associated with the periods. It may or may not further include utility pricing level setpoints and/or setpoint offsets corresponding to and/or associated with the utility pricing levels and/or enhance pricing time periods.

Methods are contemplated for operating HVAC systems in scenarios where utilities may enact enhanced pricing time periods of Critical Peak Pricing (CPP) on short notice, for example, one day in advance, in contrast with situations when utility pricing schedules may be planned and communicated well in advance, for example, for seasonal pricing. Users of HVAC systems, such as a homeowners, building superintendents, etc., that are aware of an impending CPP event may make manual inputs via the user interfaces of HVAC controllers to reduce energy consumption during the CPP event.

HVAC controllers such as controllers 300, 500, and 600 of the present disclosure may be configured to accept entry of parameters for single-occurrence enhanced pricing time periods, similar to the configurations disclosed herein for accepting entry of parameters for recurring enhanced pricing time periods. CPP HVAC control parameters (such as start and end times of the CPP event, setpoints and/or setpoint offsets, and the like) may be entered, used for control of an HVAC system during a single CPP event, and then discarded (e.g., purged from controller memory). Alternately, one or more sets of parameters for potential CPP events may be entered into an HVAC controller and stored indefinitely, then activated by user input or other means when an actual CPP event is announced.

Figure 21:
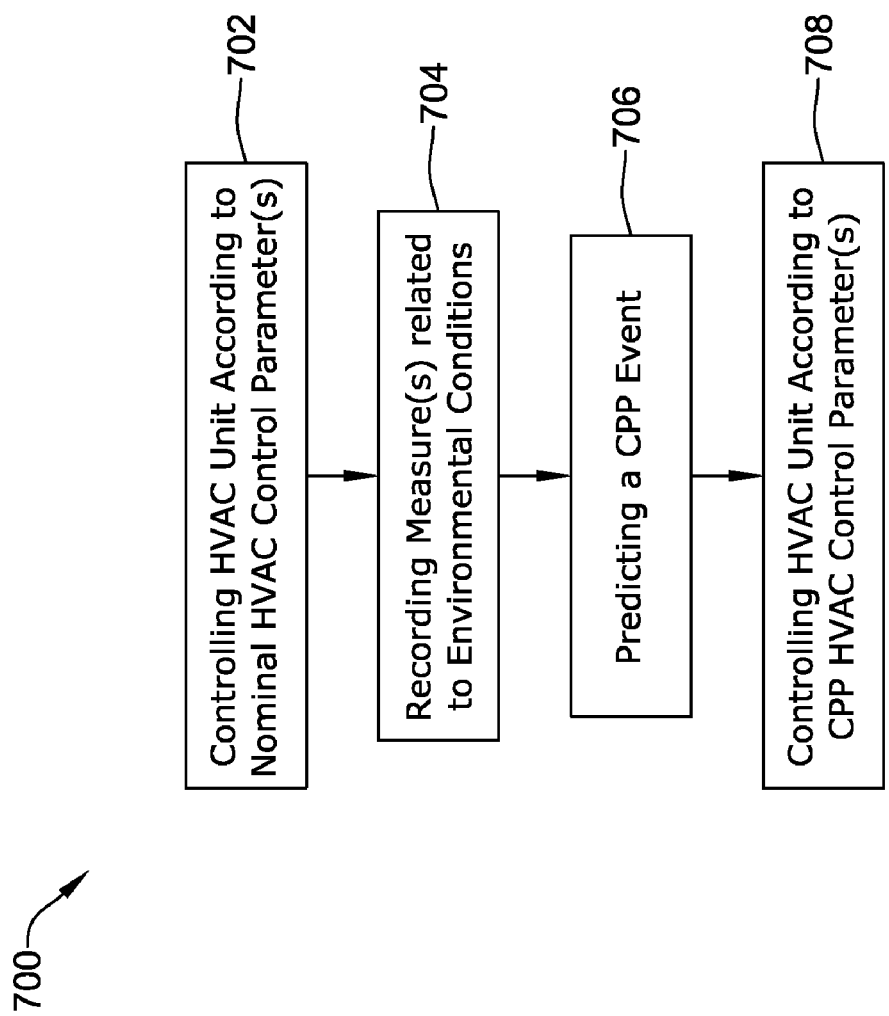
FIG. 21 is a flow diagram of another illustrative method for operating a utility-powered HVAC system including predicting a Critical Peak Pricing event.

It is contemplated that there will be cases in which a utility declares a CPP event, but users that wish to reduce energy consumption during the event might not enter or activate CPP HVAC parameters. In such a case, the opportunity to reduce energy consumption during the CPP could be lost. However, the present disclosure provides methods and devices that allow control of an HVAC system by a local HVAC controller according to at least one CPP HVAC control parameter even without explicit intervention by a user. For example, FIG. 21 is a flow diagram of an illustrative method 700 for operating a utility-powered HVAC system, such as system 10 of FIG. 1, which includes predicting a CPP event.

Method 700 includes at block 702 controlling an HVAC unit with a local HVAC controller according to at least one nominal HVAC control parameter, for example, as in the case of an HVAC system being controlled in accordance with a nominal schedule. At 704, method 700 includes recording in a memory of the local HVAC controller at least one measure related to an environmental condition of the building. Such at least one measures may include, for example, an outdoor temperature, humidity, barometric pressure, and/or entropy, as might be recorded by one or more external sensors 40 of HVAC system 10 of FIG. 1. Another example of a measure related to an environmental condition of the building could be a measure of system load, for example, the cycle time of an air conditioning compressor, the amount of electrical energy consumed in a time interval, the slope of the inside temperature change versus time when the air conditioning compressor is active, the slope of the inside temperature change versus time when the air conditioning compressor is inactive, etc. In some illustrative embodiments, the measure or measures may be recorded twice or more during a time period, which may, for example, allow for a more accurate assessment of the environmental condition of the building.

Based at least in part upon the measure(s) related to an environmental condition of the building recorded at block 704, at 706, the method 700 may include predicting a CPP event of a utility supplying power to the building. Some possible non-limiting examples of how a prediction may be made including: a prediction of a next-day CPP event may be based on a dry-bulb temperature exceeding a threshold on the current day; a temperature trend over several days may indicate an increased likelihood of a CPP event on the current day; a morning rate of rise in outdoor air (specific) enthalpy may presage an afternoon CPP event.

As part of the prediction process, a first measurement of an environmental parameter (such as, for example, an outdoor air temperature) may be used to forecast a future value for the environmental parameter, providing a basis for making a CPP prediction. Historical data of environmental conditions preceding past CPP events may be analyzed to refine prediction rubrics. In general, the method may allow any suitable prediction logic to be used. An HVAC controller may be provided with software code to carry out the prediction in any appropriate way. Such code may be updated over the life of the controller, if desired. An installer and/or an HVAC system user may enter or adjust parameters to tune the predictions of CPP events made by the HVAC controller. Further, in some illustrative embodiments, predicting a CPP event may include determining a probability value of occurrence of the CPP event, and subsequent steps of method 700 may vary depending on the probability value determined.

If a CPP event is predicted at block 706, method 700 may include at block 708 controlling the HVAC unit with the local HVAC controller according to at least one CPP HVAC control parameter. Controlling according to CPP HVAC control parameter(s) results in consuming less energy during the CPP event (when rates are elevated) relative to controlling according to nominal HVAC control parameter(s). Any suitable CPP HVAC control parameters that result in such reduced energy consumption may be used. CPP HVAC control parameters may be obtained in any appropriate way. CPP HVAC control parameters may be entered manually by a user before or after a prediction of a CPP event. CPP HVAC control parameters may be modified values of nominal HVAC control parameters, or they may not have nominal HVAC control parameter analogs. CPP HVAC control parameters may include start and end times for a CPP event enhanced pricing time period and an associated utility pricing level setpoint(s) and/or setpoint offset(s), as described herein. Such CPP HVAC control parameters may be used to override, overlay, or modify a nominal schedule to result in a utility pricing operating schedule. In some cases, CPP HVAC control parameters may include parameters related to executing HVAC system operation for pre-cooling inside air of the building in advance of the CPP event. In some illustrative embodiments, where a probability value of occurrence of the CPP event is determined in step 706, a value of one or more CPP HVAC control parameters may be assigned depending at least partially on the determined probability value of occurrence. This is one way, for example, that the response to an uncertain occurrence of the CPP event may be modulated. The more certain it is predicted that a CPP event will occur, the more definite and/or severe the control response of the HVAC system may be. When the occurrence of a CPP event is less certain, a milder control response maybe considered appropriate.

If a CPP event is predicted, method 700 may be extended to communicate a CPP signal to a non-HVAC device. In such a case, the non-HVAC device may also reduce energy consumption during the CPP event time period.

Method 700 of FIG. 21 may be extended to accepting a user selection of whether or not predictive CPP HVAC system control is desired. The step at block 708 of controlling the HVAC unit according to CPP HVAC control parameters would only be executed if a CPP event was predicted and user selection indicated that predictive CPP HVAC system control was desired. Furthermore, in some illustrative embodiments, CPP event overrides may be selected, in which case control of the HVAC unit may revert to control according to nominal HVAC control parameters (such as according to a nominal schedule). A user may manually select a CPP event override (for example, prioritizing comfort in a particular situation over energy cost savings), or it may be selected based upon a current measure related to an environmental condition of the building. For example, a CPP event may be predicted, but during the time period of the predicted CPP event, milder than anticipated weather conditions may prevail, in which case it may be likely that the utility does not execute a CPP event, and it is then not desired to control according to CPP HVAC system control parameters.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method for operating a utility-powered HVAC system for conditioning inside air of a building, the HVAC system having one or more HVAC units and a local HVAC controller having a user interface, the method comprising:
   maintaining in a memory of the local HVAC controller a nominal schedule, the nominal schedule having a number of days and one or more time periods for each of at least some of the days, the nominal schedule further having at least one setpoint associated with each of the one or more time periods;
   receiving manual input via the user interface of the local HVAC controller, the manual input including:
      accepting entry of a utility pricing schedule that corresponds to scheduled price changes of a utility, including at least one enhanced pricing time period;
      accepting entry of at least one utility price level setpoint offset to correspond to each of the at least one enhanced pricing time periods;
   modifying or overlaying the nominal schedule to include the utility pricing schedule, resulting in a utility pricing operating schedule; and
   controlling the one or more HVAC units with the local HVAC controller in accordance with the utility pricing operating schedule.

2. The method of claim 1, wherein the utility pricing schedule is provided by the utility and includes at least one recurring enhanced pricing time period.

3. The method of claim 2, wherein the at least one recurring enhanced pricing time recurs weekly.

4. The method of claim 2, wherein the utility pricing schedule includes at least two seasons, wherein the at least one recurring enhanced pricing time period corresponds to one of the two seasons.

5. The method of claim 1, wherein receiving manual input via the user interface includes accepting entry of a utility price level for each of the scheduled price changes of the utility.

6. The method of claim 5, further including accepting entry of at least one utility price level setpoint offset for each of the utility price levels.

7. The method of claim 1, further comprising:
   accepting entry of one or more utility price levels associating one of the utility price levels with each of the scheduled price changes of the utility;
   associating at least one utility price level setpoint offset with each of the utility price levels.

8. The method of claim 1, wherein the utility pricing operating schedule includes each of the enhanced pricing time periods such that one of the corresponding utility price level setpoint offsets is used to offset one of the setpoints associated with an overlapping time period of the nominal schedule to result in an operating setpoint used during the overlapping time period.

9. The method of claim 1, wherein the utility pricing operating schedule includes a pre-cooling time period.

10. The method of claim 1, further comprising:
    receiving via the user interface a manual selection of whether to enable or disable control in accordance with the utility pricing operating schedule; and
    controlling the one or more HVAC units with the local HVAC controller in accordance with the nominal schedule if manual selection to disable control in accordance with the utility pricing operating schedule is received.

11. The method of claim 1, wherein the user interface of the local HVAC controller includes a display screen and buttons, and wherein the receiving manual input is performed by a user interacting with the display screen and/or buttons.

12. The method of claim 11, wherein the display screen is a touchscreen, and at least one of the buttons is a touchscreen button.

13. The method of claim 1, wherein the local HVAC controller is a thermostat.

14. A method for operating a utility-powered HVAC system for conditioning inside air of a building, the HVAC system having one or more HVAC units and a thermostat, the method comprising:
    maintaining in a memory of the thermostat a nominal schedule, the nominal schedule having a number of days and one or more time periods for each of at least some of the days, the nominal schedule further having at least one setpoint associated with each of the one or more time periods;

receiving manual input from a user of the thermostat of a utility pricing schedule that corresponds to scheduled price changes of a utility, wherein the utility pricing schedule includes at least one enhanced pricing time period with a corresponding utility pricing level selected from at least two utility pricing levels;

receiving manual input from the user of the thermostat of at least one utility pricing level setpoint offset to correspond to each of the at least two utility pricing levels;

modifying or overriding the nominal schedule with the utility pricing schedule to result in a utility pricing operating schedule, wherein for each of the at least one enhanced pricing time periods, the at least one utility pricing level setpoint offset that corresponds to the utility pricing level of the enhanced pricing time period is used to offset one of the at least one setpoints associated with one of the one or more time periods of the nominal schedule to result in an operating setpoint of the utility pricing operating schedule for the enhanced pricing time period; and controlling the one or more HVAC units with the thermostat in accordance with the utility pricing operating schedule.

15. The method of claim 14, wherein the utility pricing schedule includes at least one weekly utility pricing schedule, where the at least one weekly utility pricing schedule includes one or more recurring enhanced pricing time periods that recur weekly.

16. The method of claim 15, wherein the at least one weekly utility pricing schedule includes one or more weekly groups of days, each of the one or more weekly groups of days including one or more days, further wherein at least one of the one or more recurring enhanced pricing time periods recurs each day of one of the one or more weekly groups of days.

17. The method of claim 15, wherein the utility pricing schedule includes at least two seasons, wherein each of the at least one weekly utility pricing schedules is associated with one of the at least two seasons.

18. The method of claim 14, wherein the thermostat includes a touchscreen, and wherein the receiving manual input can be performed by a user interacting with the touchscreen.

19. A thermostat configured to operate a utility-powered HVAC system for conditioning inside air of a building, the HVAC system having one or more HVAC units, the thermostat comprising:

a user interface configured to receive manual input from a user of a nominal setpoint schedule, as well as a utility pricing schedule that corresponds to scheduled price changes of a utility;

a memory configured to retain the nominal schedule and the utility pricing schedule; and at least one output configured to issue operational commands to the one or more HVAC units of the HVAC system;

wherein the nominal setpoint schedule includes a number of days and one or more time periods for each of at least some of the days, the nominal schedule further having at least one setpoint associated with each of the one or more time periods;

wherein the utility pricing schedule includes at least one enhanced pricing time period with a corresponding utility pricing level setpoint offset; and wherein the thermostat is configured to modify or overlay the nominal setpoint schedule in accordance with the utility pricing schedule to result in a utility pricing operating schedule, and to control the one or more HVAC units in accordance with the utility pricing operating schedule.

20. The thermostat of claim 19, wherein the user interface includes a touchscreen, such that manual input can be performed by a user interacting with the touchscreen.

* * * * *